US011230152B1

(12) United States Patent
Mavrofrides

(10) Patent No.: US 11,230,152 B1
(45) Date of Patent: Jan. 25, 2022

(54) VEHICLE REAR SUSPENSION AND METHODS OF OPERATION

(71) Applicant: Demetrios C. Mavrofrides, Orlando, FL (US)

(72) Inventor: Demetrios C. Mavrofrides, Orlando, FL (US)

(*) Notice: Subject to any disclaimer, the term of this patent is extended or adjusted under 35 U.S.C. 154(b) by 342 days.

(21) Appl. No.: 16/285,132

(22) Filed: Feb. 25, 2019

(51) Int. Cl.
*B60G 9/02* (2006.01)
*B60G 21/055* (2006.01)
*B60G 7/00* (2006.01)

(52) U.S. Cl.
CPC .............. *B60G 9/02* (2013.01); *B60G 7/005* (2013.01); *B60G 21/055* (2013.01); *B60G 2200/314* (2013.01); *B60G 2200/34* (2013.01); *B60G 2204/122* (2013.01); *B60G 2204/41* (2013.01); *B60G 2204/416* (2013.01)

(58) Field of Classification Search
CPC .................................... B60G 9/02; B60G 3/24
See application file for complete search history.

(56) References Cited

U.S. PATENT DOCUMENTS

| | | | | |
|---|---|---|---|---|
| 1,743,868 A * | 1/1930 | Royer | ...................... | B60G 9/02 280/124.11 |
| 1,866,637 A * | 7/1932 | Fageol | ................... | B60G 5/053 180/24.01 |
| 2,085,021 A * | 6/1937 | Hickman | ................. | B62D 7/16 280/89.12 |
| 2,169,670 A * | 8/1939 | Wagner | ................... | B60G 9/027 180/353 |
| 2,300,844 A | 11/1942 | Maurice | | |
| 3,157,242 A | 11/1964 | Kozicki | | |
| 3,370,670 A * | 2/1968 | Love | ........................ | B62D 9/00 180/233 |
| 3,497,233 A * | 2/1970 | Bolaski, Jr. | ............ | B60G 7/006 280/86.757 |
| 3,831,965 A * | 8/1974 | Dickens | .................... | B60G 3/04 280/124.107 |
| 4,550,926 A * | 11/1985 | MacIsaac | ................. | B60G 3/18 280/124.103 |
| 4,750,751 A * | 6/1988 | Schafer | ................ | A01D 75/285 180/41 |
| 5,000,476 A * | 3/1991 | Lindorfer | .................. | B60G 3/26 280/124.107 |
| 5,020,820 A * | 6/1991 | Renner | ................... | B60G 9/027 280/124.116 |
| 5,322,309 A * | 6/1994 | Hurlburt | .................. | B60G 9/02 180/266 |
| 5,322,310 A * | 6/1994 | Hurlburt | .................. | B60G 9/02 180/266 |

(Continued)

FOREIGN PATENT DOCUMENTS

| | | | | |
|---|---|---|---|---|
| CA | 2402741 A1 * | 5/2003 | .............. | B60G 9/02 |
| CN | 110053437 A * | 7/2019 | | |

(Continued)

*Primary Examiner* — Nicole T Verley
(74) *Attorney, Agent, or Firm* — Brian S. Steinberger; Hilary F. Steinberger; Law Offices of Brian S. Steinberger, P.A.

(57) ABSTRACT

Systems and methods for improving vehicle rear suspension and operation and to reduce the 3D trajectory motion of the suspension components into separate linear and rotational movements, and allow for a more stable and steady vehicle ride.

10 Claims, 23 Drawing Sheets

(56) References Cited

U.S. PATENT DOCUMENTS

| | | | | |
|---|---|---|---|---|
| 5,447,321 A * | 9/1995 | Hurlburt | ............... | B60G 9/02 |
| | | | | 180/266 |
| 5,797,607 A * | 8/1998 | Kopczynski | ............ | B60G 9/02 |
| | | | | 280/5.514 |
| 5,829,542 A * | 11/1998 | Lutz | ................... | B60K 7/0007 |
| | | | | 180/65.6 |
| 6,109,630 A | 8/2000 | Dazy | | |
| 6,267,526 B1 * | 7/2001 | McLaughlin | ......... | B60G 7/003 |
| | | | | 180/352 |
| 6,547,028 B1 * | 4/2003 | Green | ................. | B60G 9/02 |
| | | | | 180/349 |
| 6,863,289 B2 | 3/2005 | Buhl | | |
| 7,207,408 B2 * | 4/2007 | Kuroki | ................. | B62K 5/027 |
| | | | | 180/210 |
| 7,464,948 B2 * | 12/2008 | Ramsey | ............... | B60G 7/001 |
| | | | | 280/124.107 |
| 7,934,579 B2 * | 5/2011 | Bowers | ................ | B60G 7/04 |
| | | | | 180/352 |
| 8,056,911 B2 * | 11/2011 | Husson | ................ | B60G 9/00 |
| | | | | 280/93.502 |
| 8,272,652 B2 * | 9/2012 | Majerik | .............. | B60G 11/003 |
| | | | | 280/124.116 |
| 8,398,179 B2 * | 3/2013 | Mackin | .............. | B60B 35/1054 |
| | | | | 301/128 |
| 8,668,214 B2 * | 3/2014 | Elliott | ................. | F16C 11/0695 |
| | | | | 280/124.156 |
| 9,114,682 B1 * | 8/2015 | Bandy | ................... | B60G 3/20 |
| 9,180,735 B2 | 11/2015 | Tipton | | |
| 9,623,928 B2 * | 4/2017 | Mori | ...................... | B62K 5/10 |
| 9,694,676 B2 * | 7/2017 | Bandy | .................. | B60K 5/02 |
| 9,902,227 B1 | 2/2018 | Mavrofrides | | |
| 10,710,405 B2 * | 7/2020 | Roach | ................. | B60B 35/001 |
| 10,894,571 B2 * | 1/2021 | Kanehara | ............ | B62K 5/027 |
| 10,919,354 B2 * | 2/2021 | Stuart | ................ | B60G 11/107 |
| 2002/0101052 A1 * | 8/2002 | Panizzolo | ........... | B60G 17/016 |
| | | | | 280/124.111 |
| 2002/0155917 A1 * | 10/2002 | Nagata | ................. | B60G 9/02 |
| | | | | 475/220 |
| 2003/0160416 A1 * | 8/2003 | Leen | .................... | B60G 7/001 |
| | | | | 280/124.116 |
| 2005/0173883 A1 * | 8/2005 | Mayenburg | ........ | B60G 11/465 |
| | | | | 280/124.116 |
| 2006/0234567 A1 * | 10/2006 | Longdill | .................. | B60G 3/24 |
| | | | | 440/12.5 |
| 2007/0090621 A1 * | 4/2007 | Vigen | .................... | B62D 17/00 |
| | | | | 280/124.134 |
| 2007/0193815 A1 | 8/2007 | Hobbs | | |
| 2009/0178875 A1 | 7/2009 | Bowers | | |
| 2009/0218781 A1 * | 9/2009 | Sellars | .................. | B60G 9/022 |
| | | | | 280/124.116 |
| 2011/0115184 A1 * | 5/2011 | Johnson | ............. | B60G 21/0551 |
| | | | | 280/124.111 |
| 2011/0175316 A1 * | 7/2011 | English | .................... | B60G 9/00 |
| | | | | 280/124.116 |
| 2011/0272908 A1 * | 11/2011 | Tempelman | ........... | B60G 7/001 |
| | | | | 280/124.121 |
| 2013/0033011 A1 * | 2/2013 | Pfiffner | .................... | B62D 9/00 |
| | | | | 280/5.514 |
| 2014/0265205 A1 * | 9/2014 | Dudding | ................ | B60G 11/27 |
| | | | | 280/124.116 |
| 2015/0360562 A1 | 12/2015 | Kamil | | |
| 2016/0229249 A1 * | 8/2016 | Mori | ........................ | B62K 5/10 |
| 2017/0057351 A1 * | 3/2017 | Bandy | ..................... | B60K 5/02 |
| 2017/0144501 A1 * | 5/2017 | Wall | ....................... | B60G 11/28 |

FOREIGN PATENT DOCUMENTS

| | | | | |
|---|---|---|---|---|
| DE | 1067696 B * | 10/1959 | ............. | B60G 3/24 |
| DE | 2658932 A1 * | 6/1978 | ........... | B62D 53/021 |
| DE | 2748715 A1 * | 5/1979 | ............. | B60G 3/24 |
| DE | 3872252 * | 7/1992 | ............. | B60G 9/027 |
| DE | 29608229 U1 * | 8/1996 | ............. | B62D 13/02 |
| DE | 9321272 U1 * | 12/1996 | ............. | B60G 5/053 |
| DE | 102015009667 A1 * | 1/2017 | ............. | B60G 3/20 |
| DE | 102018205718 A1 * | 10/2019 | ........ | B60G 21/0556 |
| EP | 0598425 A1 * | 5/1994 | ............. | B62D 9/00 |
| EP | 0914978 A1 * | 5/1999 | ............. | B60G 5/03 |
| EP | 1234695 A1 * | 8/2002 | ............. | B60G 9/02 |
| FR | 870806 A * | 3/1942 | ............. | B60G 11/14 |
| FR | 1490924 A * | 8/1967 | ............. | B60G 11/08 |
| FR | 1573273 A * | 7/1969 | ........... | B60G 15/062 |
| GB | 563128 A * | 8/1944 | ............. | B60G 3/24 |
| GB | 1012078 A * | 12/1965 | ............. | B60G 3/24 |
| JP | 2012121434 A * | 6/2012 | | |
| WO | WO-9602397 A1 * | 2/1996 | ........... | B60K 17/165 |
| WO | WO-2012060745 A1 * | 5/2012 | ........... | B60G 21/055 |

\* cited by examiner

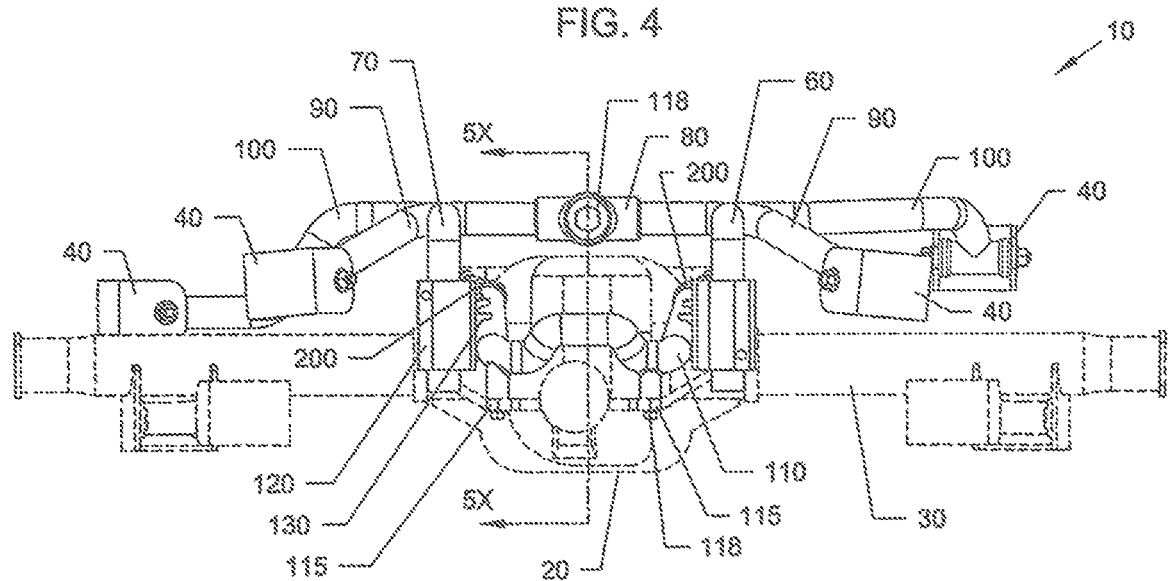

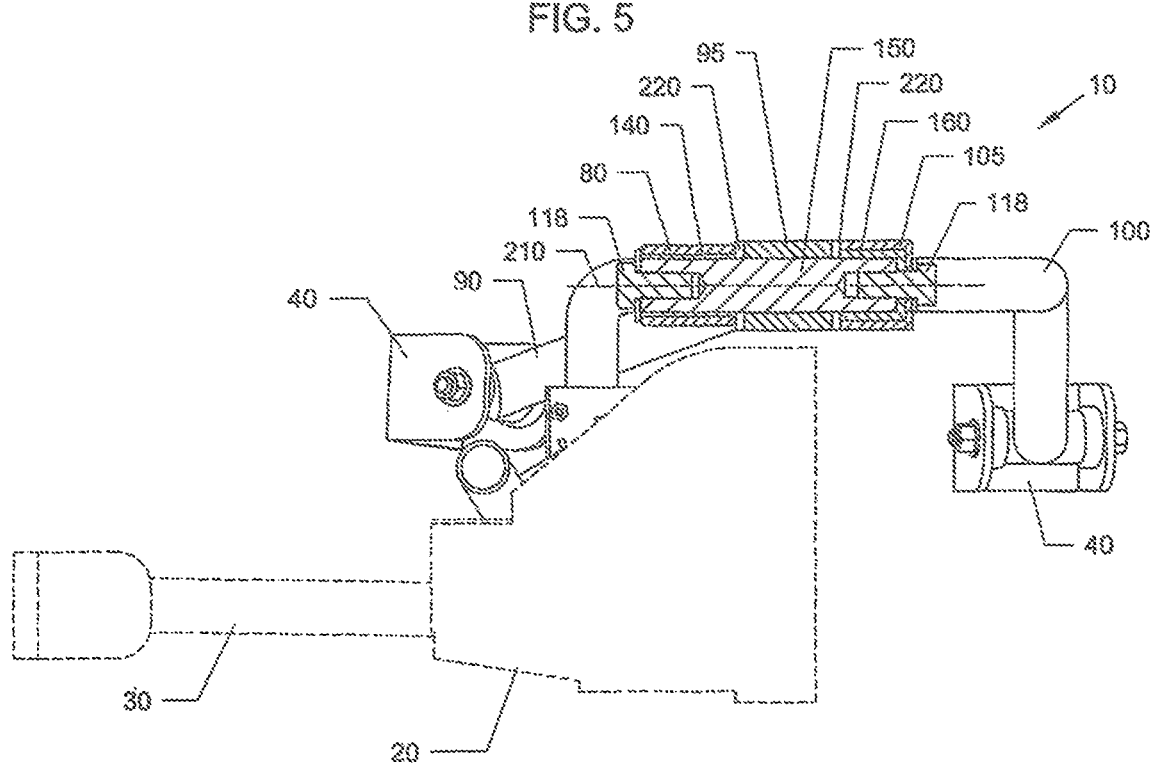

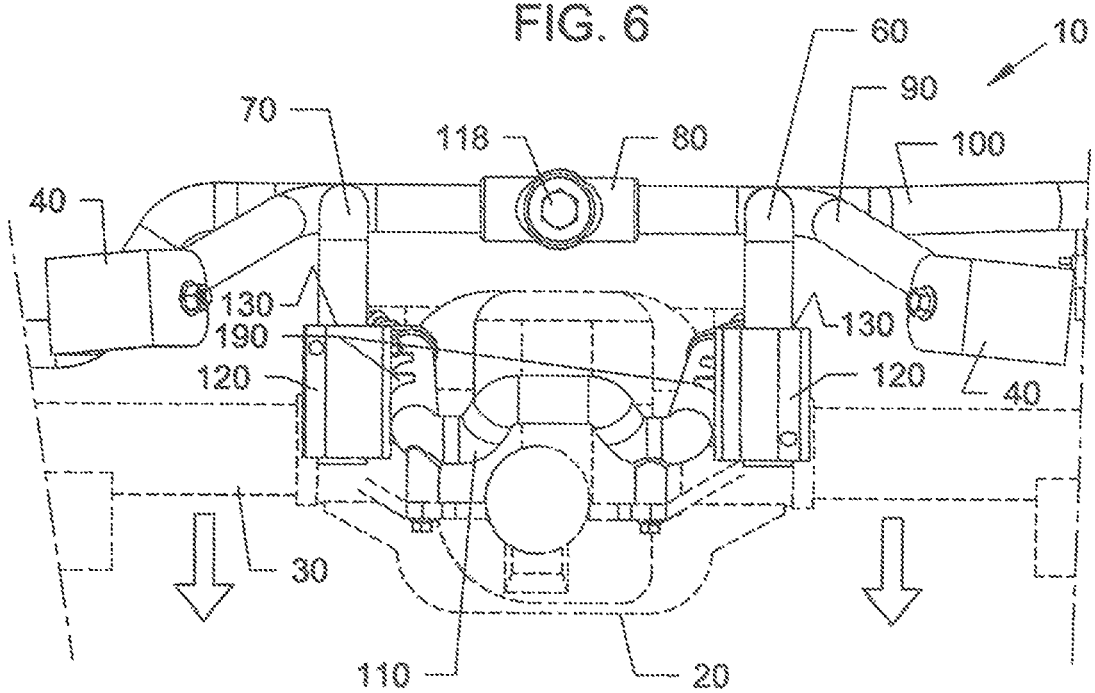
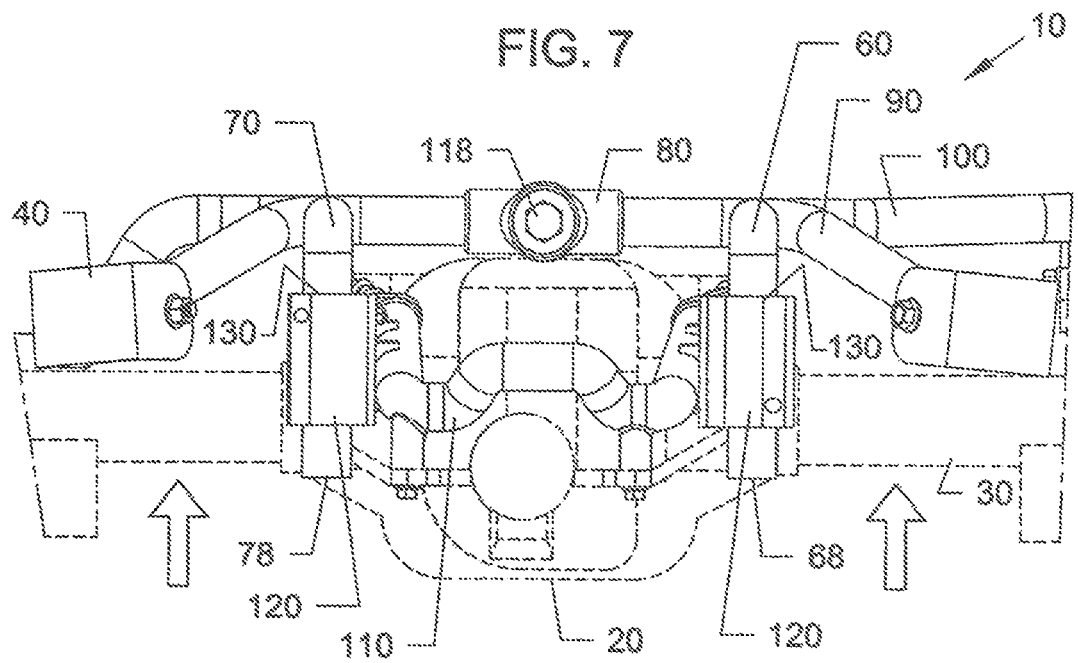

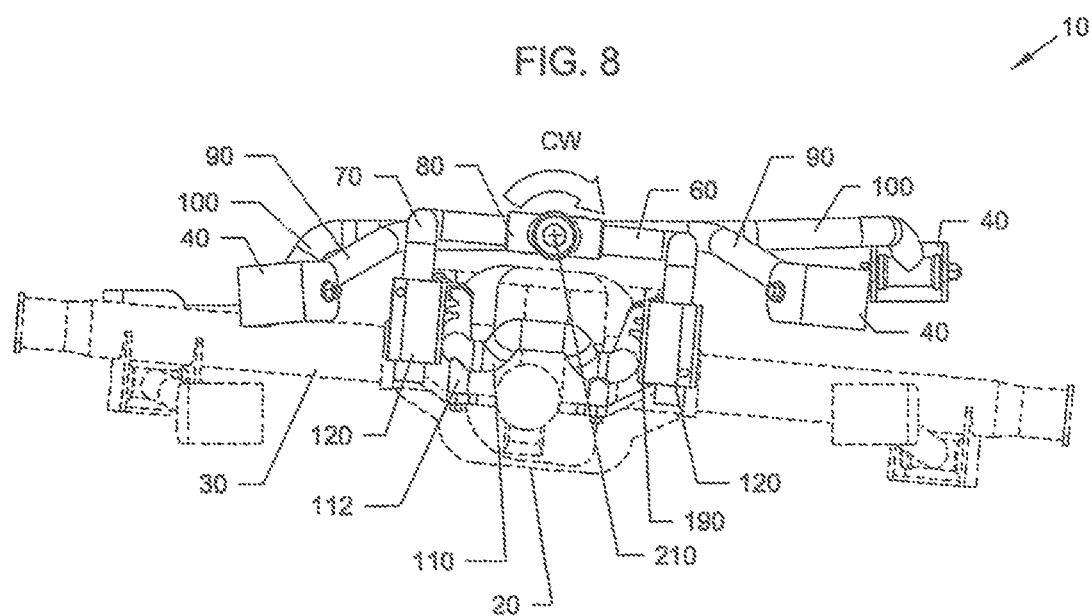

VEHICLE REAR SUSPENSION AND METHODS OF OPERATION

FIELD OF INVENTION

This invention relates to vehicles and in particular to systems, assemblies and methods for improving vehicle suspension system design and operation.

BACKGROUND AND PRIOR ART

Automotive vehicles, whether classified as car or truck, can be described as having three main components; the chassis, drivetrain, and suspension. The chassis is comprised of the body, which may or may not include a frame, and the passenger and storage compartments. The drivetrain propels the vehicle and contains components that attach to either the chassis or suspension. Lastly, the suspension is what literally suspends the chassis of the vehicle above the road and maintains a variable connection between the chassis and wheels, which contact the road surface. Henceforth, a wheel is defined as a combination of a tire mounted on a vehicle rim.

The chassis is the central unit to which the drivetrain and suspension attach. The drivetrain is comprised of the engine, transmission, transfer case (4 wheel drive vehicles), driveshaft or drive shafts, differential, and/or differential housing, although in some cases the transmission and differential are combined units. Some of the drivetrain components attach to the chassis directly and others attach to the suspension parts. The suspension has multiple functions and as such, is usually comprised of many different components. These components vary depending on whether they are located in the front or rear of the chassis, whether the vehicle is a car or truck, whether the vehicle is front, rear, or all-wheel drive, and whether the vehicle is for racing, commuter travel, or heavy industrial use. Some the components that comprise a vehicle suspension system are control arms, rods, linkages, rims and tires, shocks, sway bars, steering parts, axles, hubs, spindles and even the air in the tires. Most of these parts attach between the chassis or drive line components and other suspension parts that connect to the wheels, which are typically axles, hubs, and/or spindles.

The objective of the suspension is to keep the wheels in constant contact with the road in order to maintain maximum traction and control, and at the same time provide for a smooth ride for passengers seated within the chassis cab. The vehicle suspension system isolates the chassis from road hazards and irregularities for passenger comfort and safety, and maintains constant active contact with the road surface while providing the driver with the ability to safely control the vehicle under all traffic and road conditions such as potholes, uneven grades, turns, debris and obstacles. This means that the wheels are allowed to move freely along predefined paths relative to the chassis, and with these paths being determined by the suspension components. The most common type of suspension component that connects the chassis to the wheels is a control arm. A control arm has at least two ends with one end attaching to the chassis and the other to the components interacting or housing the axles and hubs which mount the wheels. Thus, as one end of the control arm is fixed to the chassis, the other end is free to move with the wheels.

The up and down movement of the wheels as they roll along the road surface can be defined by trajectories. Trajectories are 3-dimensional paths with start and end points in defined x, y, and z axes relative to the chassis. The control arm length, shape, attachment point to the chassis, and location relative to other control arms, determines the exact path of the wheel trajectories. The sum of the individual suspension trajectories determines the actual path of the wheels as they move with the road surface, relative to the chassis. Depending on the arrangement of these induvial suspension components, they can interfere with each other's intended trajectories. This means that the individual components might pull or push the same wheel along opposite or divergent paths or trajectories. This conflicting interaction is typically called suspension bind.

The invention is applicable to any vehicle with at least two wheels and a solid axle, axle housing or solid differential housing connecting two wheels opposite each other. The invention will be explained and shown with a solid differential housing that would contain axles to which the wheels are affixed. For this reason, the chassis attaching points and solid differential housing are sufficient to explain the workings of the invention and its components. The differential housing, control arms, and attaching points to the chassis are considered prior art.

SUMMARY OF THE INVENTION

A primary objective of the present invention is to provide systems, and assemblies for improving vehicle suspensions with solid axles or solid differential housings.

A secondary objective of the present invention is to provide methods for improving operation of automotive vehicle suspensions with solid axles or solid differential housings.

A key feature of this invention is that it significantly reduces suspension bind in certain types of existing suspension systems with solid axles or solid differential housings.

Currently, this invention is not used in the manufacture of new vehicles; however, it can be modified to be used in the manufacture of new vehicles.

This invention can be retrofitted to existing vehicles by modifying the chassis and/or the attaching points of components connected to structures that house or support the axles or drive shafts. Also, it may be necessary to make changes to the physical shape of the individual components of the invention. However, the interaction of the individual components of the invention in relation to each other would not change.

The suspension system of a vehicle balances passenger ride quality with driver feedback and control. This is accomplished by the keeping the wheels in maximum contact with varying road conditions and also affixed to the vehicle chassis in a flexible and constantly variable connection. Often times, these two directives are conflicting and reduced characteristics of one allow for enhanced characteristics of the other. Price may also affect the type of suspension system used on a vehicle and how well it accomplishes either directive. As a result, a single suspension component may be required to execute multiple tasks that would normally be handled by multiple suspension components. Furthermore, these suspension components have a tendency to interfere with each other's function, compromising handling, comfort and control. The main goal of this invention is to provide enhanced suspension components for vehicles with for solid axles or solid differential housings. These enhanced components are configured such that each component of the invention performs a specific singular task. And collectively they allow the axle housing to move freely in a 3 dimensional space with minimal interference among the individual components that comprise the entire system.

This is accomplished by each component of the invention delineating movement along a specific axis or limiting rotation about a specific axis.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements. The invention is illustrated with a typical solid-axle rear differential system.

First Embodiment

FIG. 4 is a front view showing the rear suspension assembly of FIG. 1.

FIG. 5 is a cross-sectional view of the rear suspension assembly of FIG. 4 along arrows 5X.

FIG. 6 is another front view of the rear suspension assembly of FIG. 4, showing the axle at the low point of its 'Y' axis travel as indicated by the motion arrows.

FIG. 7 is another front view of the rear suspension assembly of FIG. 6 showing the axle at the high point of 'Y' axis travel.

FIG. 8 is another front view of the rear suspension assembly of FIG. 6 showing axle twisted to the extreme of its clockwise rotation about the 'X' axis.

Second Embodiment

Figure 11:
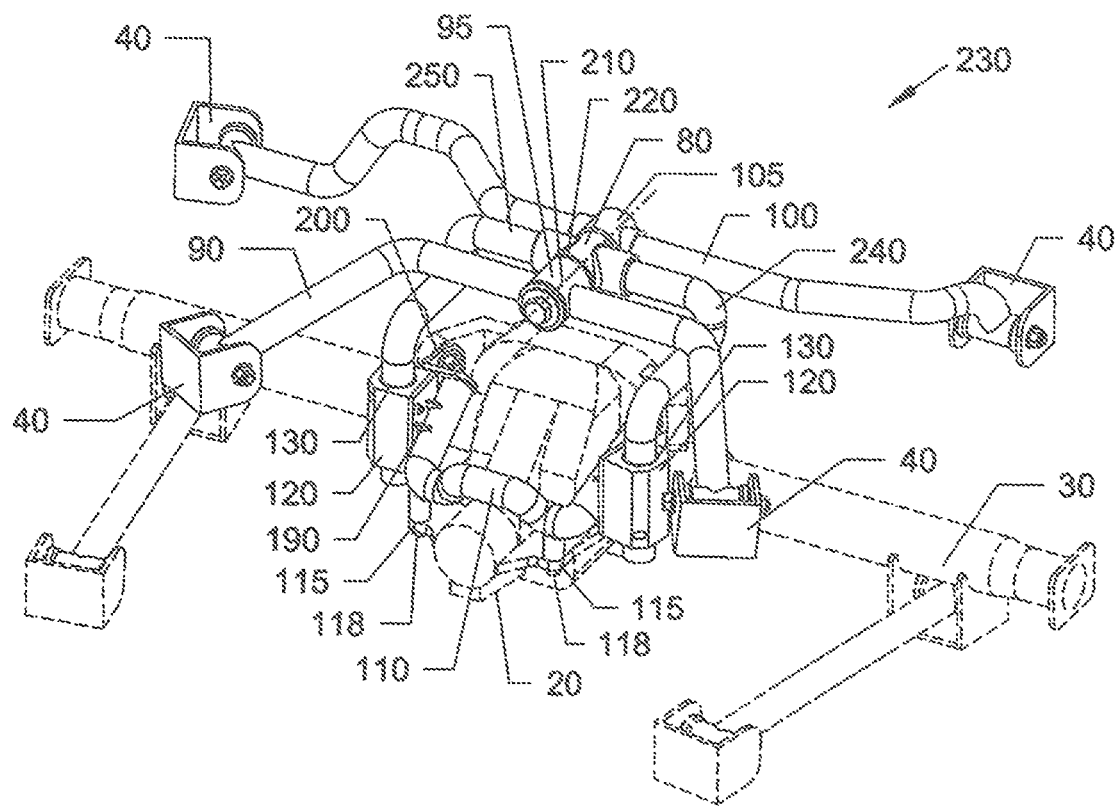

FIG. 11 is a front perspective view of a second embodiment of the rear suspension assembly which differs from the first embodiment only in placement of the main pivot body, 80, and the stabilizer arms (noted as BAC orientation).

Figure 12:
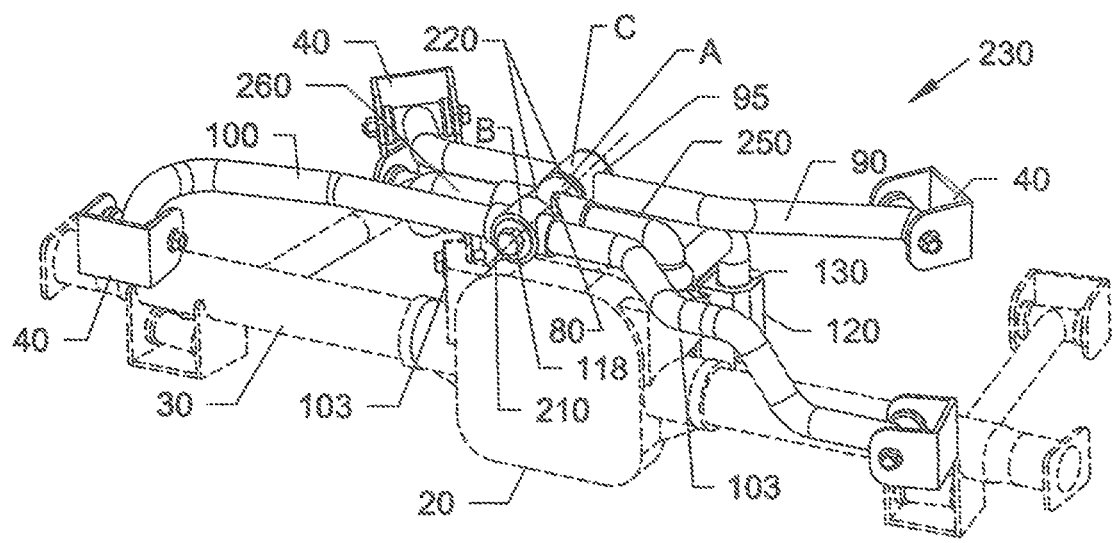

FIG. 12 is a rear perspective view of the rear suspension assembly of FIG. 11.

Third Embodiment

Figure 13:
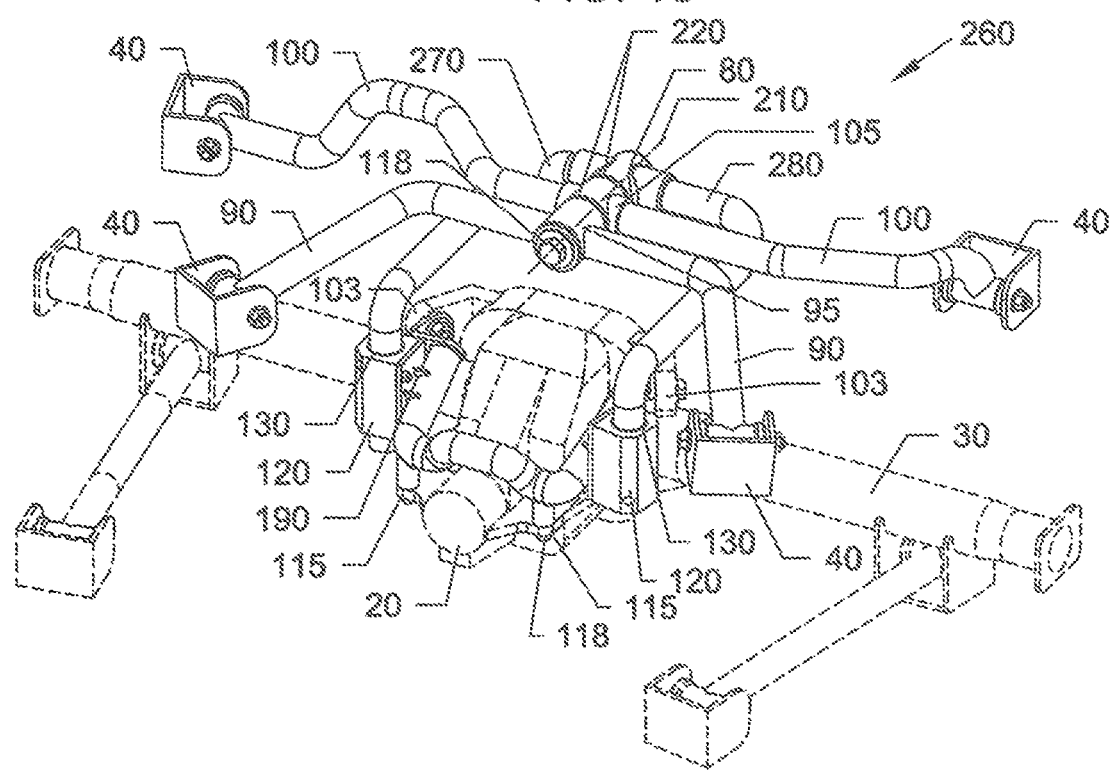

FIG. 13 is a front perspective view of a third embodiment of the rear suspension assembly which differs from the first and second embodiments only in placement of the main pivot body, 80, and the stabilizer arms (BCA orientation).

Figure 14:
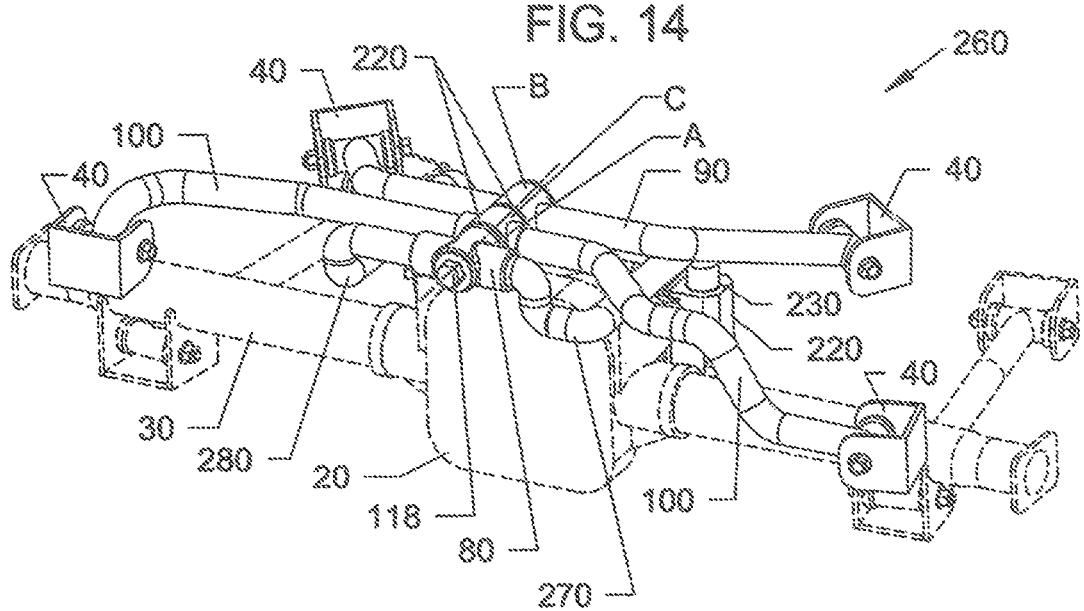

FIG. 14 is a rear perspective view of the third embodiment of the rear suspension assembly of FIG. 13.

Fourth Embodiment

Figure 1:
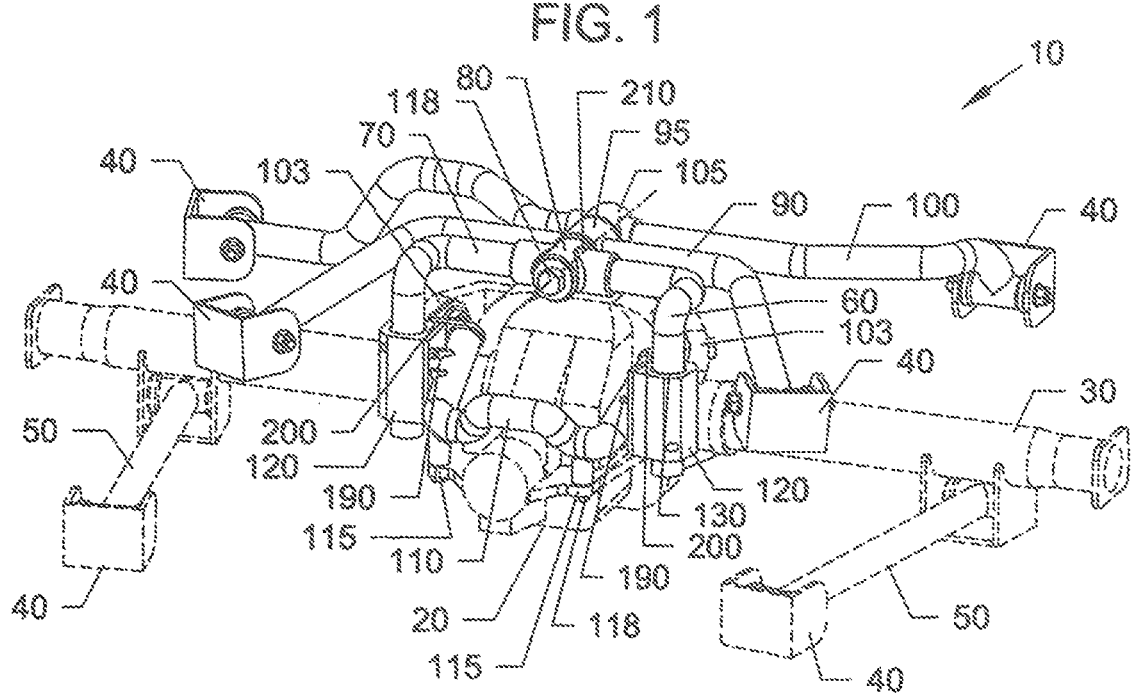
FIG. 1 is a front perspective view of a first embodiment of the rear suspension assembly (noted as ABC orientation).
Figure 2:
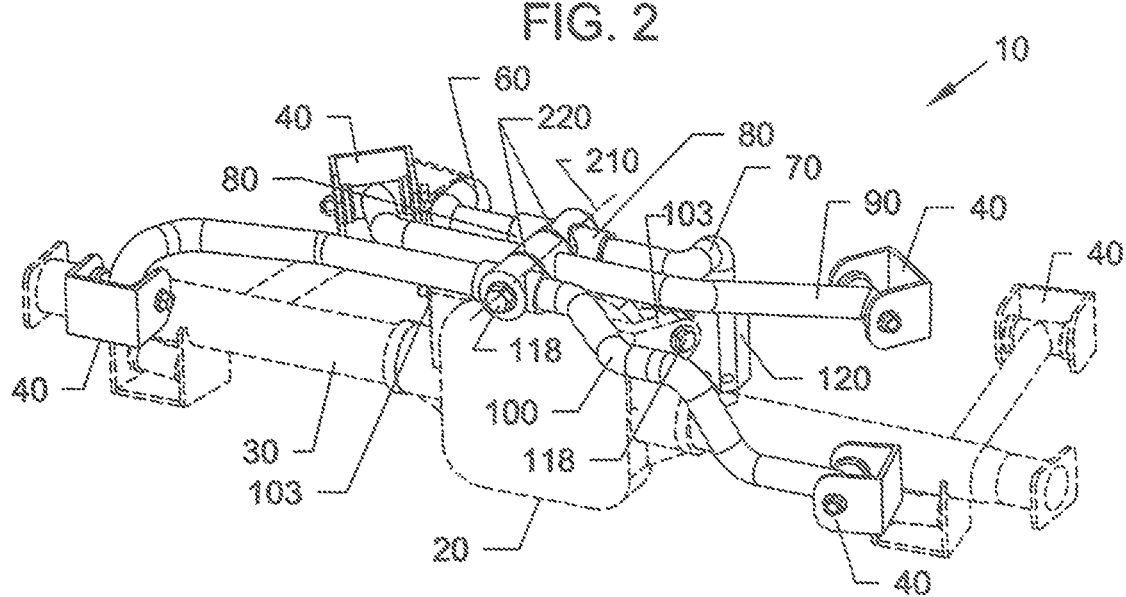
FIG. 2 is a rear perspective view of the rear suspension assembly of FIG. 1.
Figure 3:
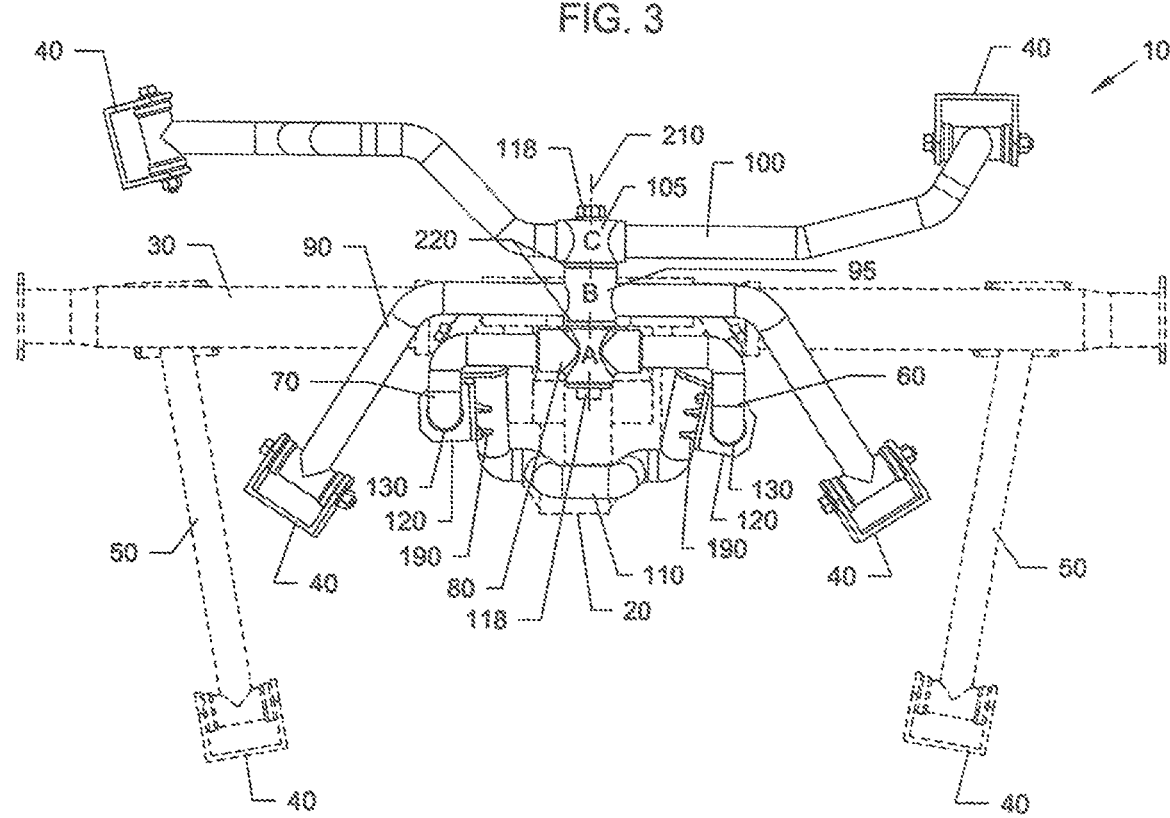
FIG. 3 is a top view showing the rear suspension assembly of FIG. 1.
Figure 15:
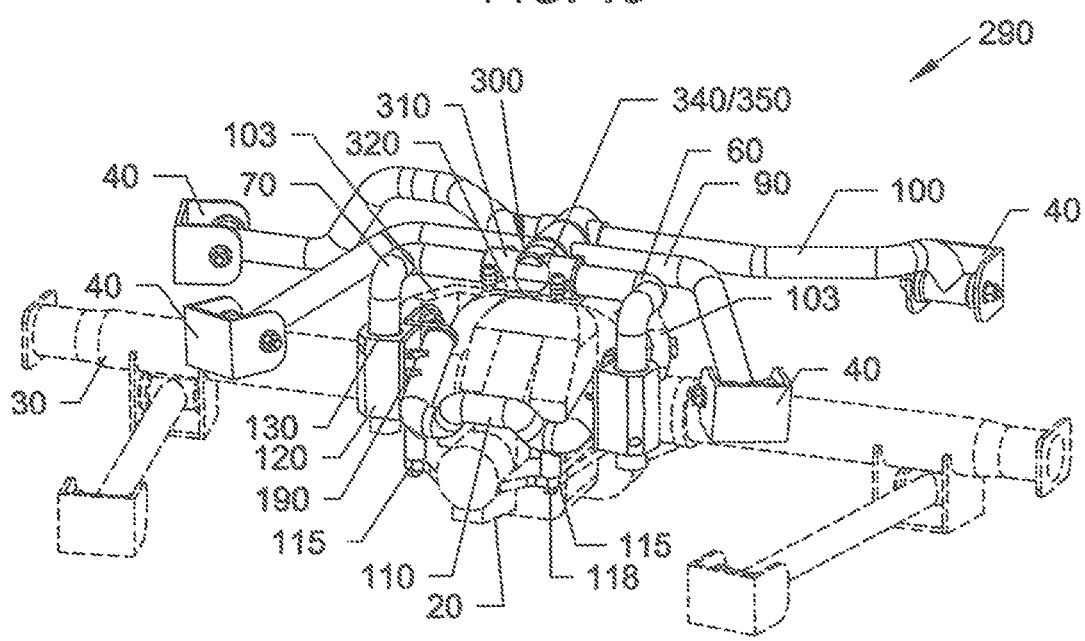

FIG. 15 is a front perspective view of the first embodiment rear suspension assembly of FIGS. 1-3 with a full 360 degree pivot motion by way of a ball joint.

Figure 16:
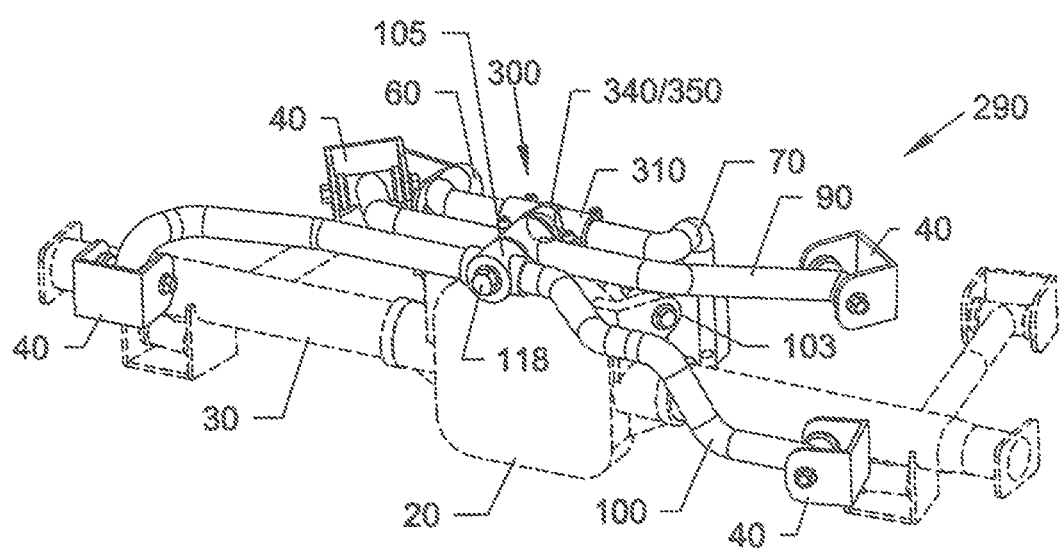

FIG. 16 is a rear perspective view of the fourth embodiment rear suspension assembly of FIG. 15.

Figure 17:
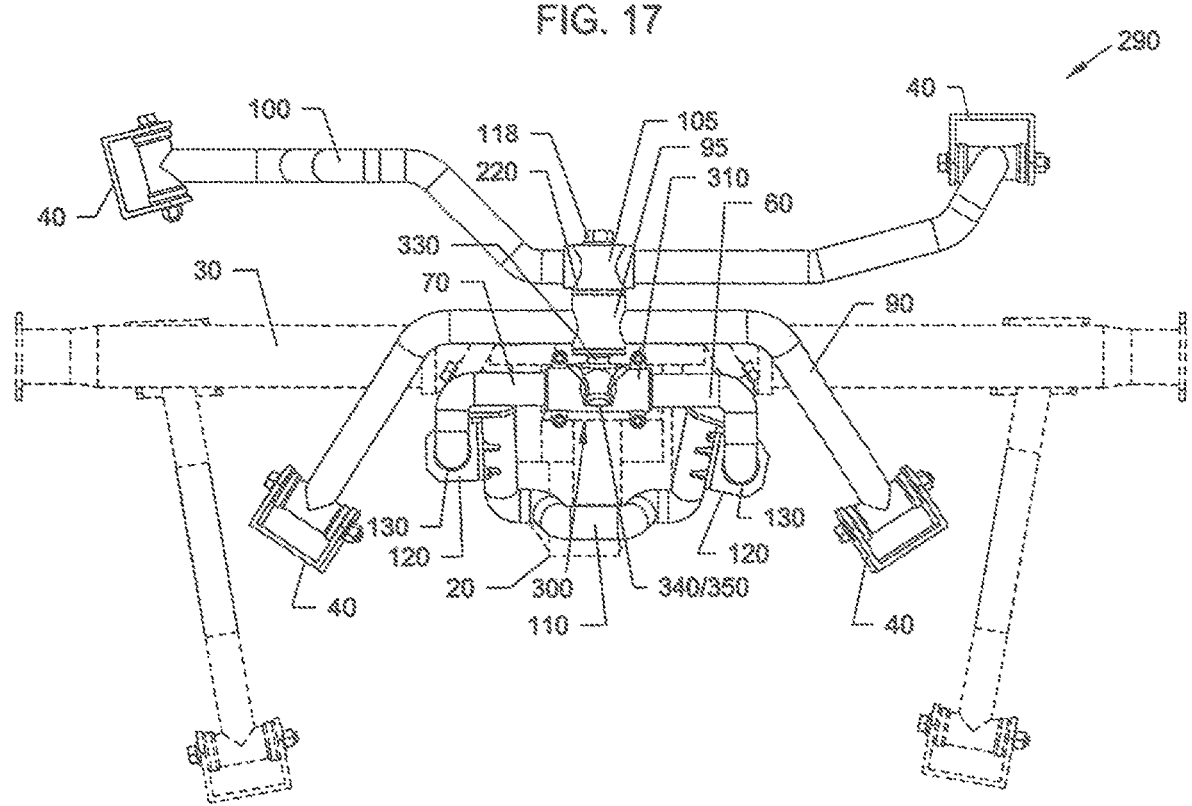

FIG. 17 is a top view of the fourth embodiment rear suspension assembly of FIG. 15.

Figure 18:
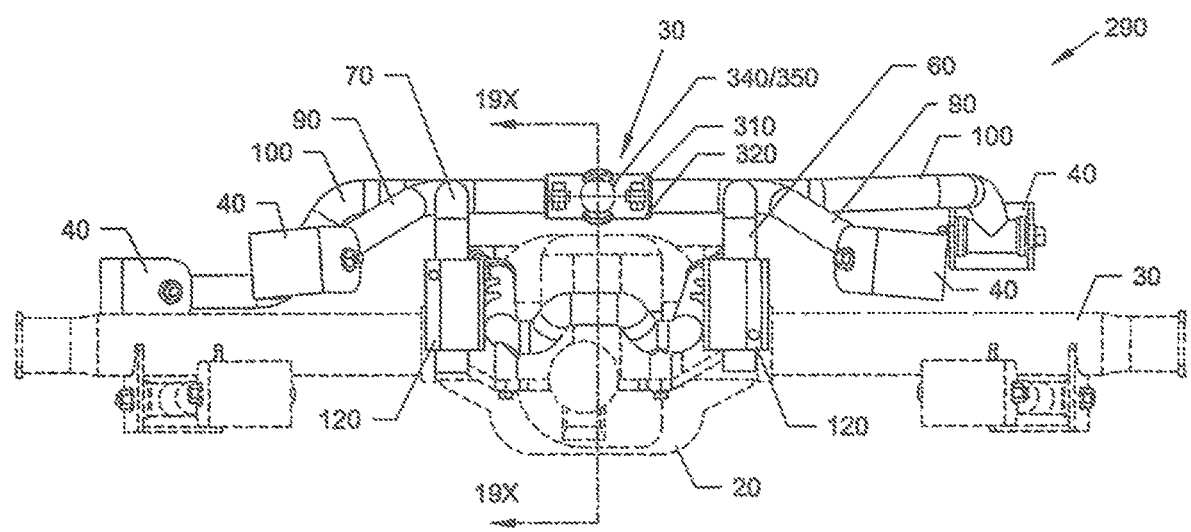

FIG. 18 is a front view of the fourth embodiment rear suspension assembly of FIG. 15.

Figure 19:
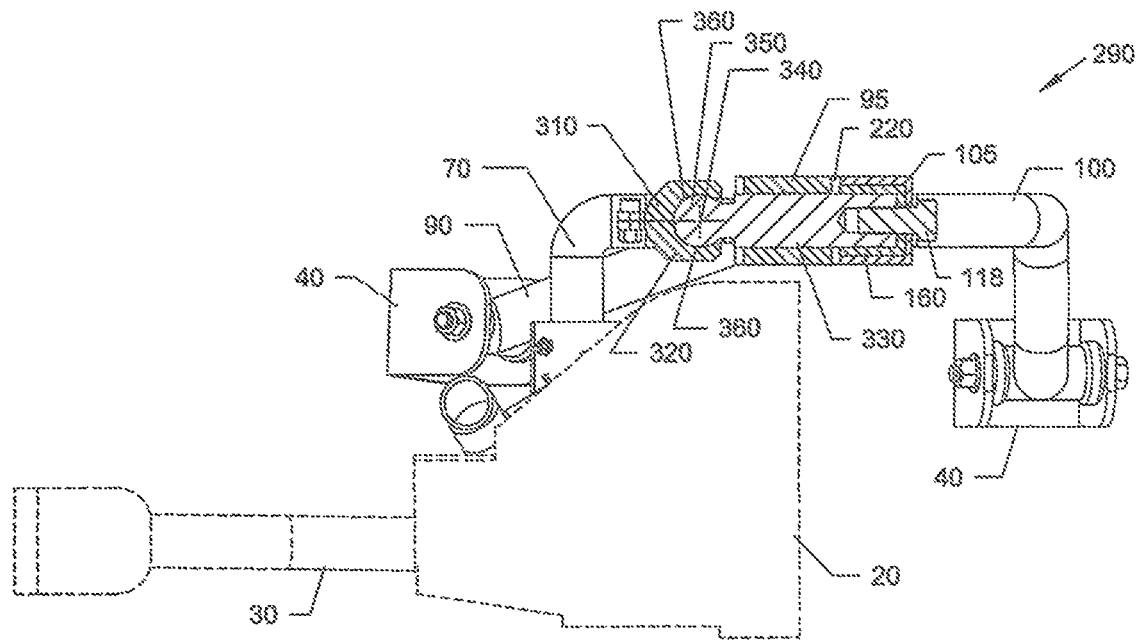

FIG. 19 is a cross-sectional view of the rear suspension assembly of FIG. 18 along arrows 19X.

Figure 20:
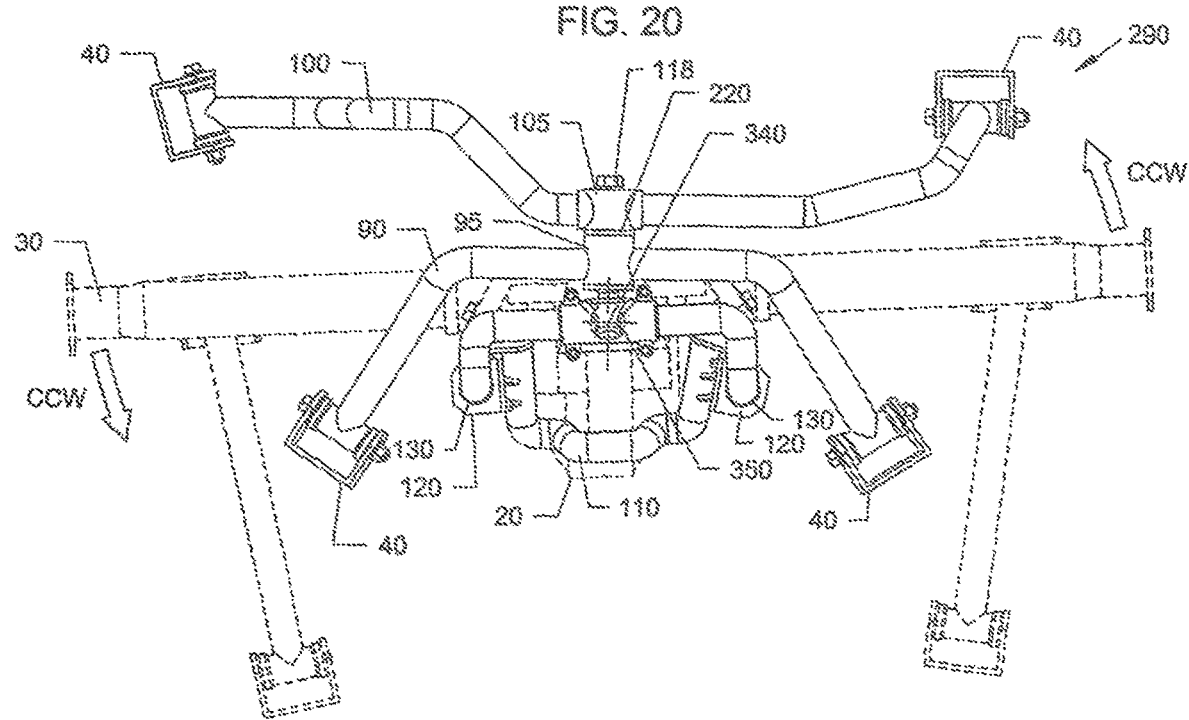

FIG. 20 is a top view of the fourth embodiment rear suspension assembly of FIG. 15 showing counter-clockwise motion about the 'Y' axis, facilitated by use of the pivot ball joint.

Figure 21:
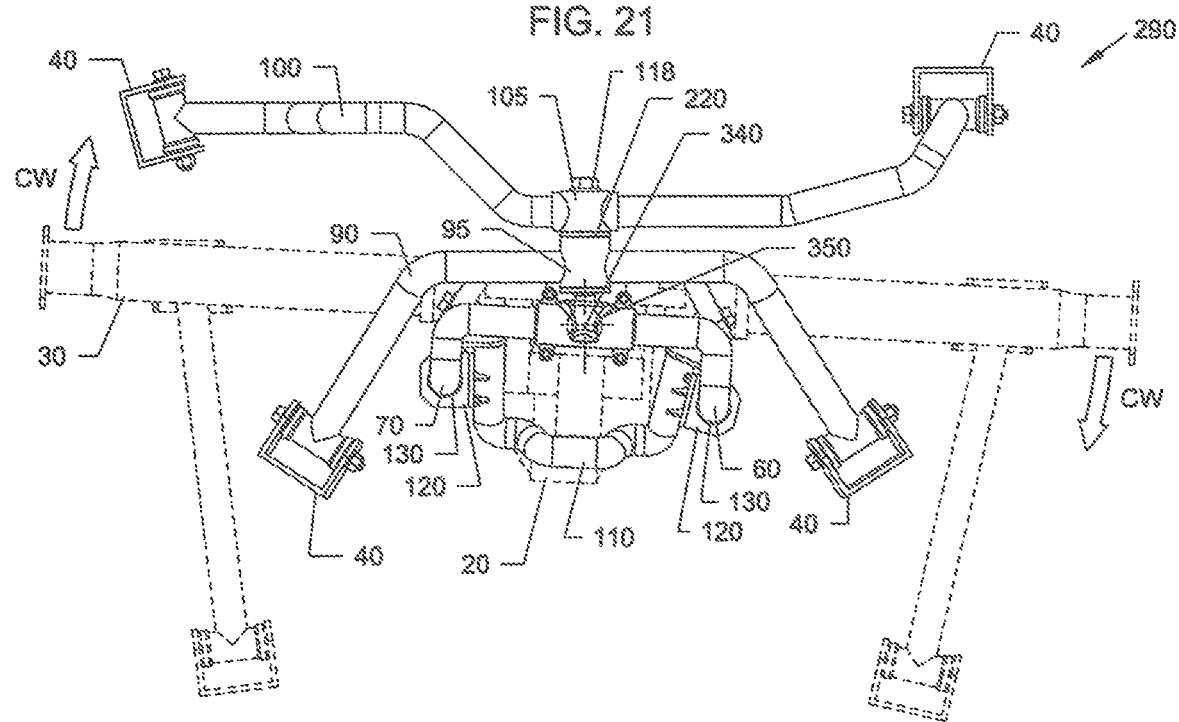

FIG. 21 is a top view of the fourth embodiment rear suspension assembly of FIG. 20 showing clockwise motion about the 'Y' axis.

Figure 22:
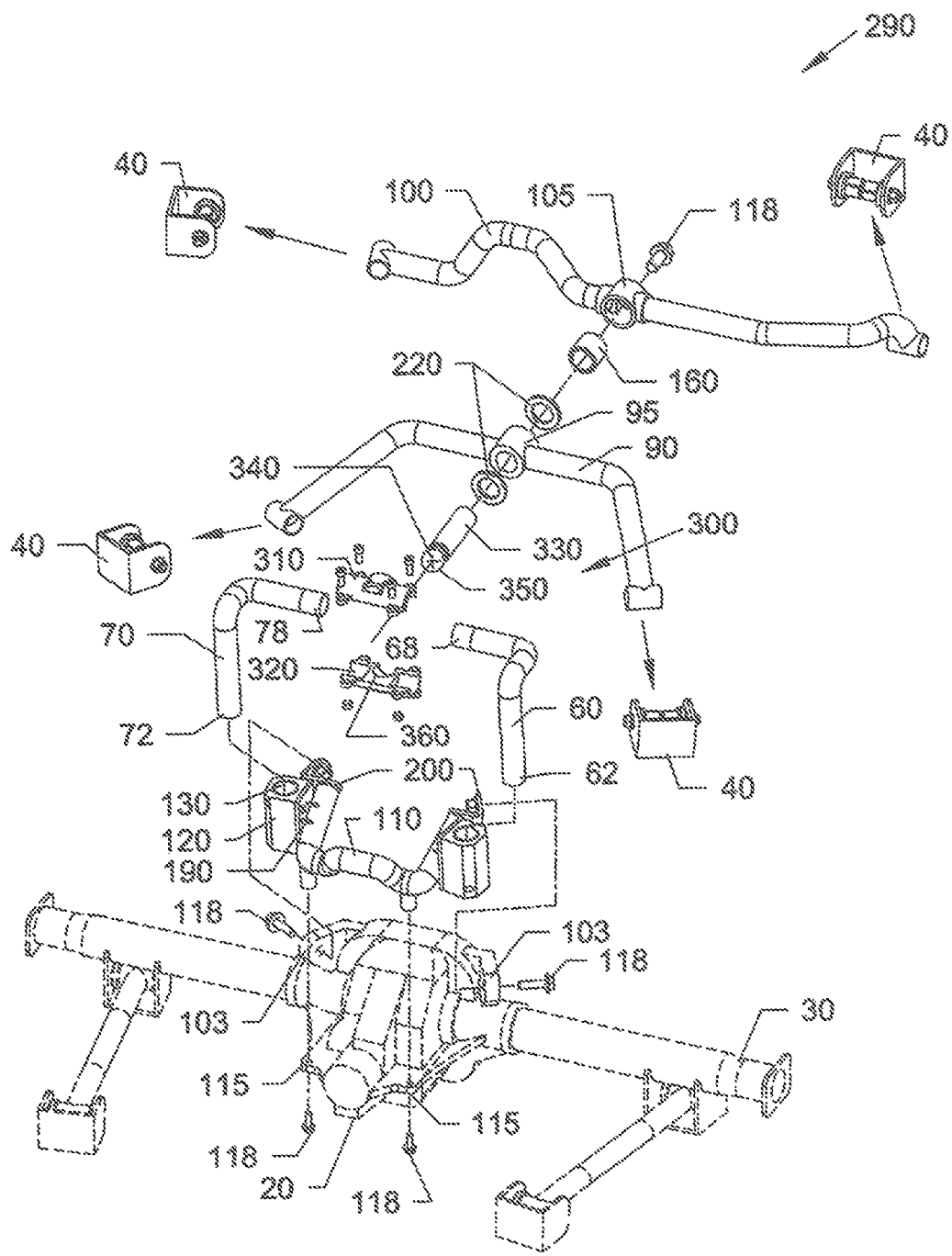

FIG. 22 is an exploded perspective view of the fourth embodiment rear suspension assembly of FIGS. 15-21.

Fifth Embodiment

Figure 23:
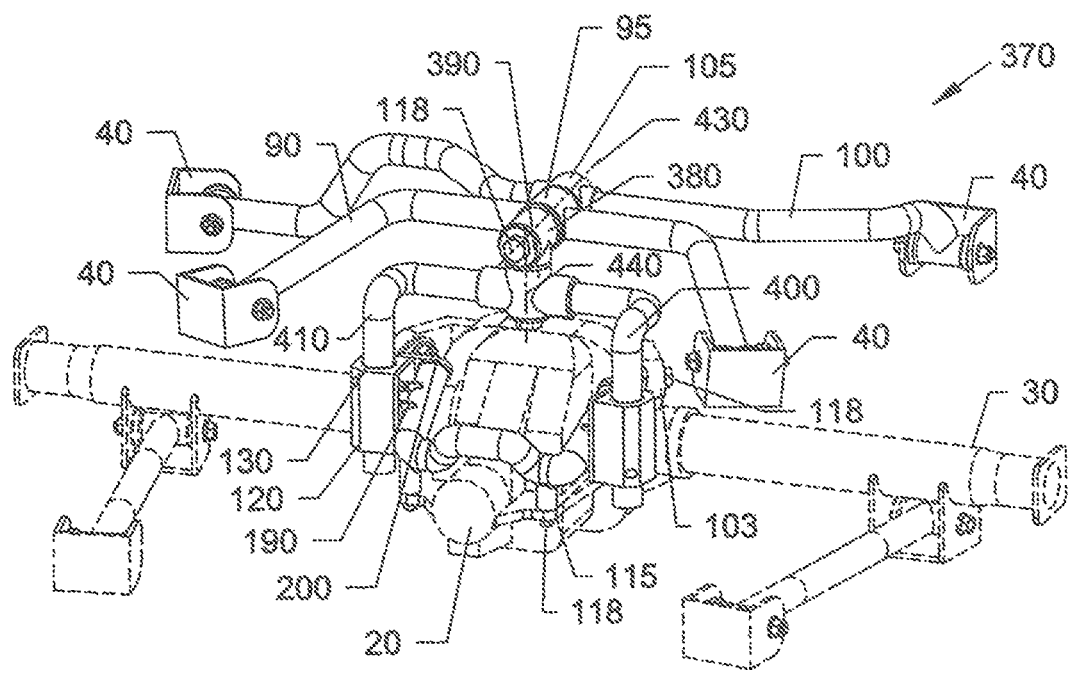

FIG. 23 is a front perspective view of the first embodiment rear suspension assembly with a second linear shaft, added along the 'Y' axis to facilitate the 360 degree motion established in the fourth embodiment.

Figure 24:
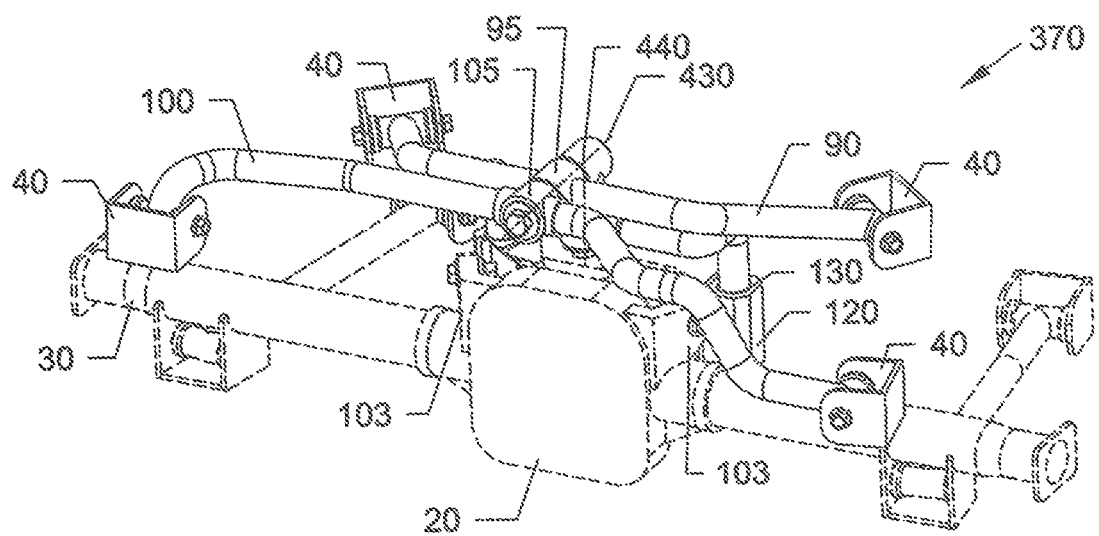

FIG. 24 is a rear perspective view of the fifth embodiment rear suspension assembly of FIG. 23.

Figure 25:
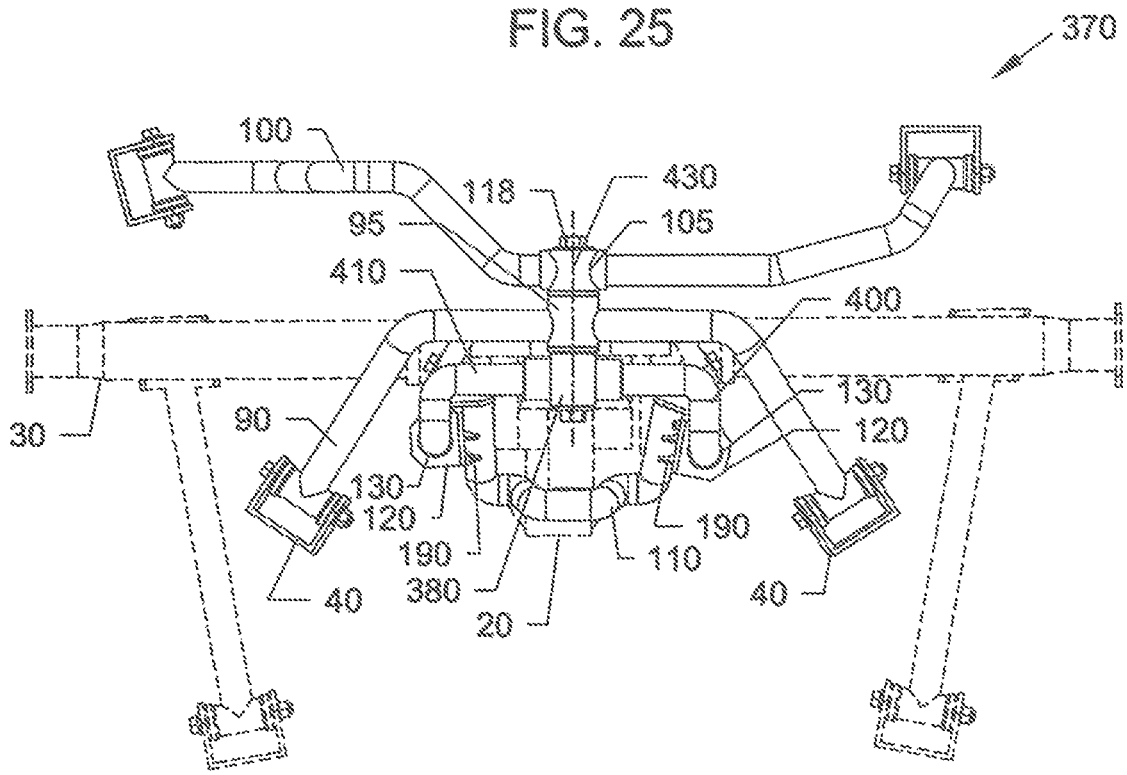

FIG. 25 is a top view of the fifth embodiment rear suspension assembly of FIG. 23.

Figure 26:
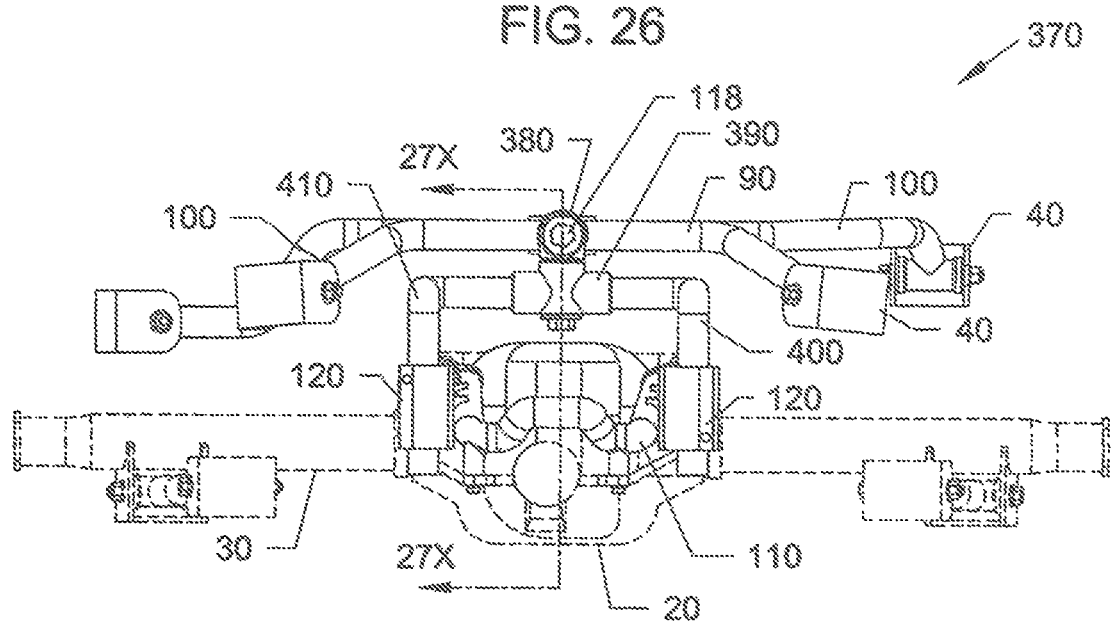

FIG. 26 is a front view of the fifth embodiment rear suspension assembly of FIG. 23.

Figure 27:
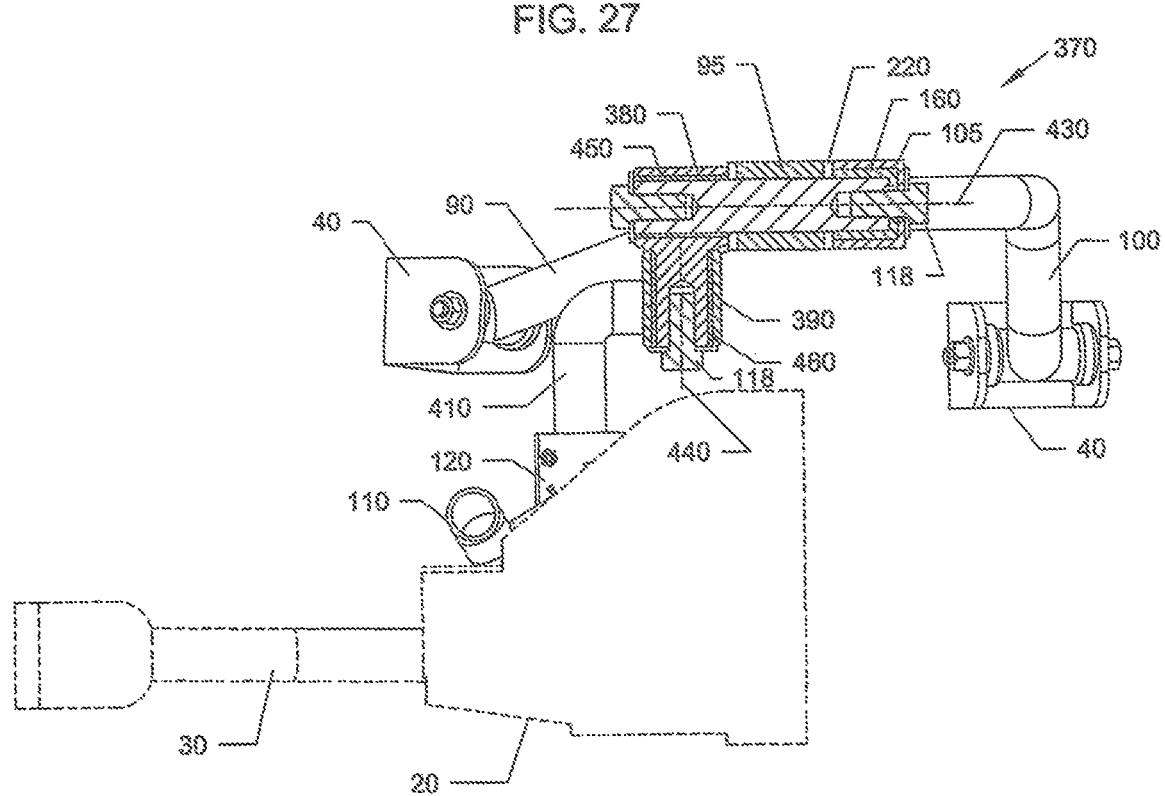

FIG. 27 is a cross-sectional view of the rear suspension assembly of FIG. 26 along arrows 27X.

Figure 28:
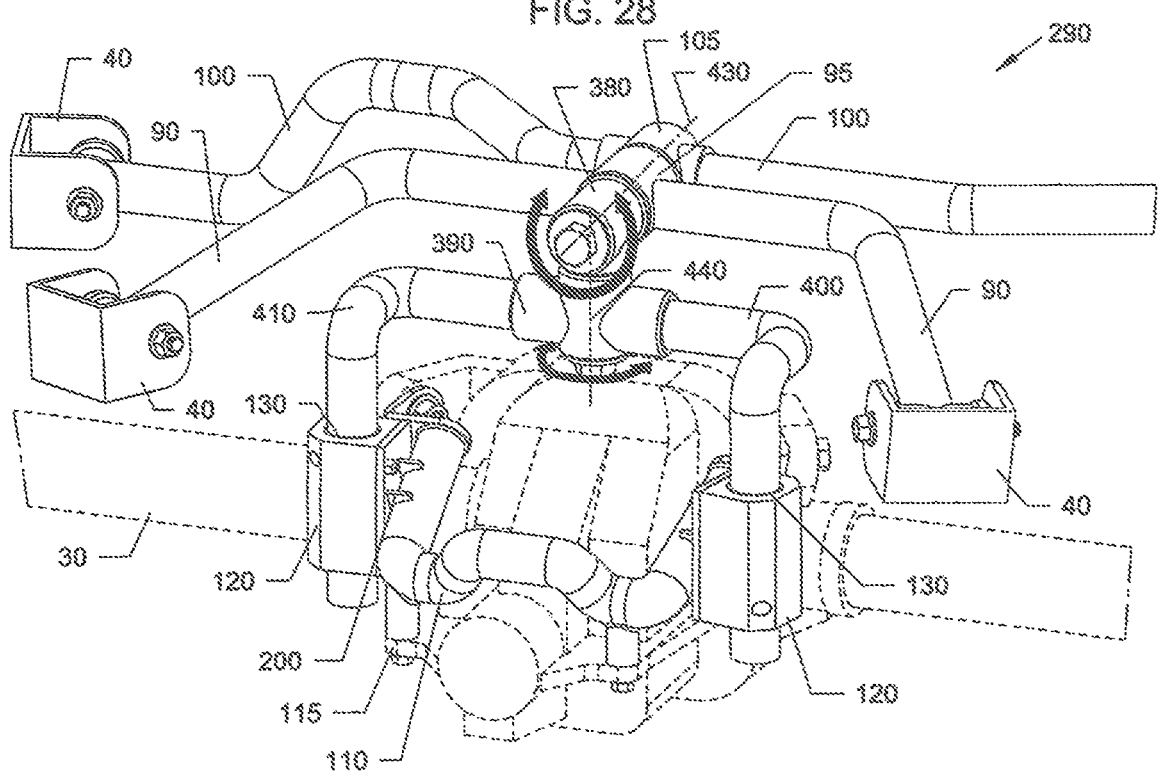

FIG. 28 is top front perspective view of the fifth embodiment rear suspension assembly of FIGS. 23-27, showing rotation about the 'X' and 'Y' axis.

Figure 29:
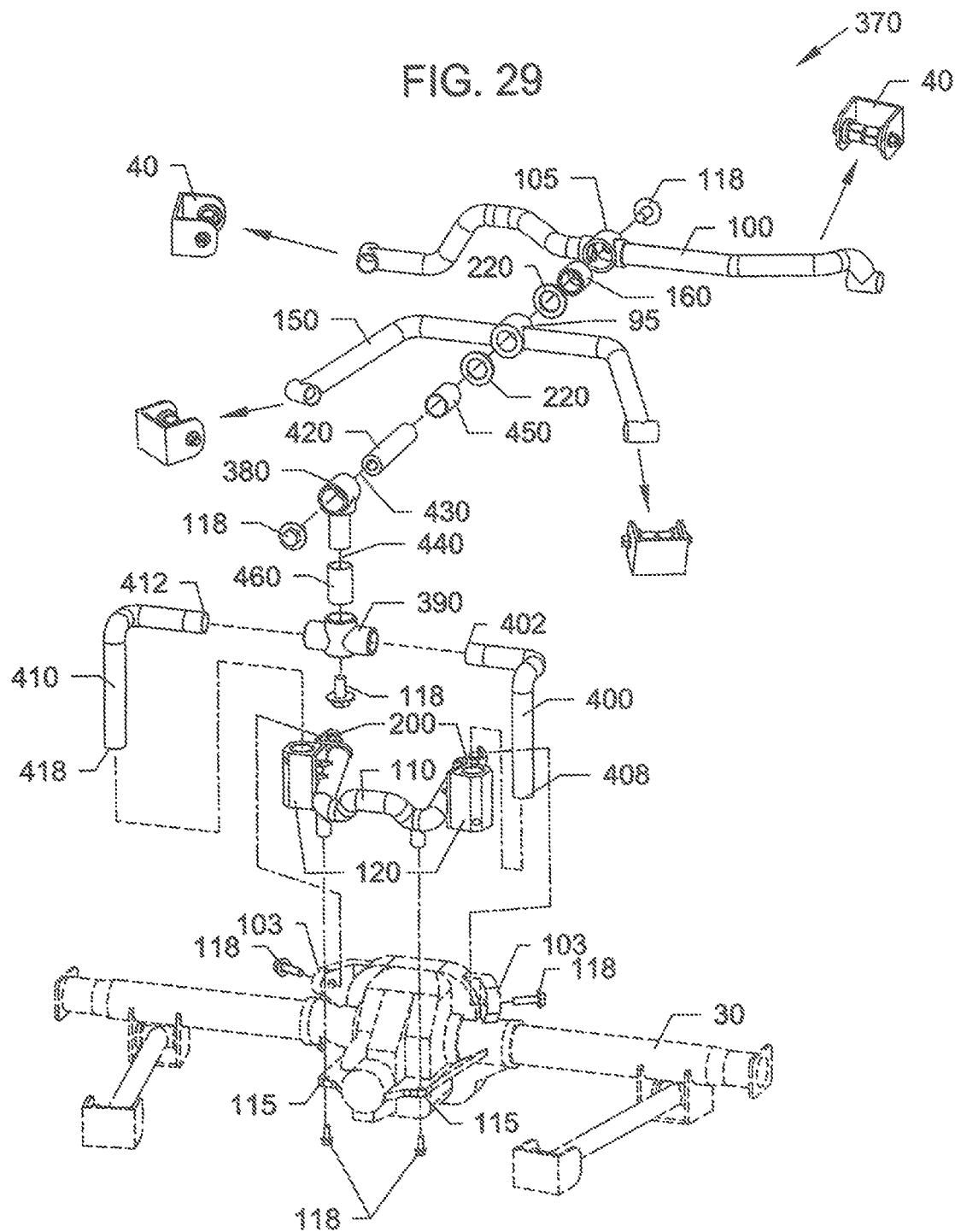

FIG. 29 is an exploded perspective view of the fifth embodiment rear suspension assembly of FIGS. 23-28.

Sixth Embodiment

Figure 30:
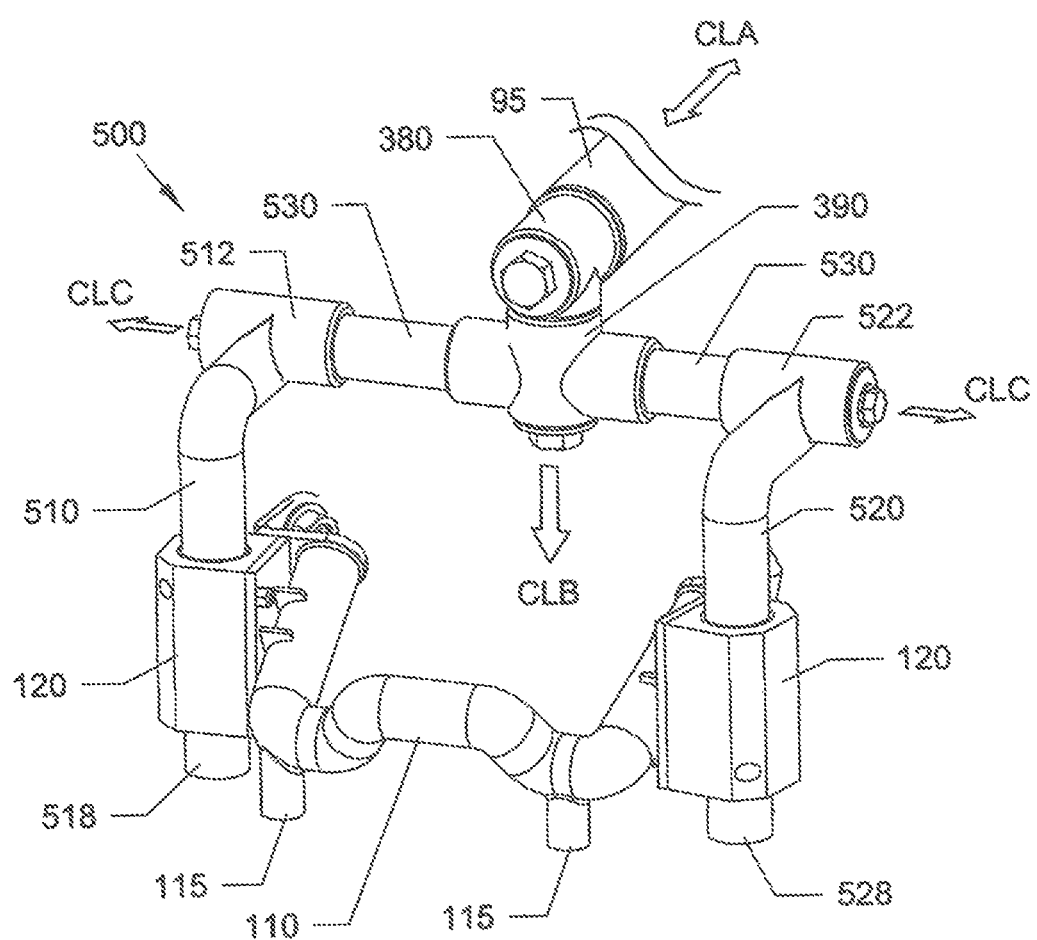

FIG. 30 is a perspective view of a sixth embodiment of the rear suspension assembly with an added swivel/rotation points added to the intermediate bracket stabilizer bodies.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The inventor has previously worked on vehicle rear suspension and methods of operation. See U.S. Pat. No. 9,902,227 to Mavrofrides, which is incorporated by reference in its entirety.

A right angle, three-axis coordinate system is defined for the purposes of establishing orientation and describing functional operation of the components. The 'X' axis is parallel to the centerline of the chassis and runs font to back of the vehicle. The 'Z' axis is parallel to the wheel axles and runs from the left side of the vehicle to the right. Lastly, the 'Y' axis is vertical to the road surface or runs from the road surface up to the top of the vehicle chassis. There are 3 main parts to the invention and they are listed below:

1. Chassis Bracket; comprised of main components 90, 95, 100, 105, and 150.
2. Intermediate Bracket; comprised of main components 80, 60, and 70.
3. Differential Bracket; comprised of main components 110, 120, and 200

1. Chassis Bracket

The Chassis Bracket is rigidly mounted to the vehicle, through bushings or typical suspension mounting points. The main piece of the chassis bracket is a tube or shaft or rod that is aligned with or is parallel with the centerline of the vehicle that runs from front to back, not side to side, along the 'X' axis. This centerline is also perpendicular to the front and/or rear axle and/or axle housing centerlines which run parallel to the 'Z' axis. The attachment of the intermediate bracket can be anywhere along the chassis center line and along the pivot shaft 150. This is shown in the ABC, BAC, and BCA drawings in FIGS. 3, 11 and 13 respectively.

2. Intermediate Bracket

The intermediate bracket has a tube or fixture, 80, that rotates about the chassis bracket shaft or rod. The idea is that the entire Intermediate Bracket can rotate about the center shaft or rod of the Chassis Bracket. There is no telescoping motion, i.e. movement along the chassis centerline, 'X' axis, just rotation about the axis. The other elements of the intermediate bracket are rods or tubes that connect with the differential bracket. There is no restriction of these, other than they perform a telescoping function with corresponding elements of the differential bracket. Either the intermediate bracket has features that telescope over corresponding elements of the differential bracket or vice versa.

Another rotational element is for the Intermediate Bracket arms to swivel about an axis that is perpendicular to the Chassis Bracket centerline.

In addition, there is the option of having the Intermediate Bracket arms rotate, in unison, about an axis, CLB, perpendicular to the Chassis Bracket shaft centerline CLA, where CLA is parallel to the 'X' axis. And to also rotate about an axis, CLC that is both perpendicular to CLA and CLB. Please refer to the attached diagram, FIG. 30.

In summary, the main aspects of the Intermediate Bracket are the following; 1. The connection and interaction with the Chassis Bracket is such that it rotates about its centerline. 2. The Intermediate Bracket also has an element or component that rotates about a centerline perpendicular to the Chassis centerline. 3. The secondary centerline also rotates about the Chassis Bracket centerline forming a type of universal joint. 4. There is a third centerline about which the arms that connect with the Differential Bracket can rotate in unison. 5. The Intermediate Bracket telescopes in relation to the Differential Bracket 3. Differential Bracket The differential bracket is rigidly connected to the differential or axle housing. The interaction of the Differential Bracket and the Intermediate Bracket is such that one telescopes or slides over the other. Again, it does not matter which is the inner or outer tubes. The centerline of this interaction is independent of both the vehicle and axle centerlines.

The part of the Differential Bracket that telescopes in relation to the Intermediate Bracket is rigidly attached to the components of the differential bracket that attach to the differential housing. In summary, the main aspects of the Differential Bracket are the following; 1. The connection and interaction with the Intermediate Bracket is such that one telescopes over the other. 2. The Differential Bracket is rigidly attached to the differential housing.

A list of components for the FIGURES will now be described.

10 Solid axle differential assembly. First Embodiment
20 Differential
30 Axle housing.
40 Bushing bracket.
50 Control arm.
60 Stabilizer arm, left. First Embodiment.
62 Stabilizer arm, left, upper end.
68 Stabilizer arm, left, lower end.
70 Stabilizer arm, right. First Embodiment.
72 Stabilizer arm, right, upper end.
78 Stabilizer arm, right, lower end.
80 Main pivot body, A. First Embodiment.
90 Pivot Shaft Mount Support, B.
95 Pivot Shaft Mount, B.
100 Pivot Shaft Mount Support, C.
103 Upper differential mount flange.
105 Pivot Shaft Mount, C.
110 Differential mount tube.
115 Lower differential mount flange.
118 Bolt & washer.
120 Bushing block.
130 Bearing or bushing housed in bushing block.
140 Pivot bushing for pivot shaft mounts.
150 Pivot shaft. First Embodiment.
160 Pivot shaft Bushing.
190 Bushing block gussets fit to differential mount tube.
200 Brackets on end of differential mount tube and connect to upper differential mount flanges.
210 'X' pivot axis for pivot shaft. First Embodiment.
220 Pivot body washer.
230 Rear end assembly. Second Embodiment. Differs only in the placement of the main pivot body, 80, and stabilizer arms.
240 Stabilizer arm, left. Second Embodiment.
250 Stabilizer arm, right. Second Embodiment.
260 Rear end assembly. Third Embodiment. Differs only in the placement of the main pivot body, 80, and stabilizer arms.
270 Stabilizer arm, right. Third Embodiment.
280 Stabilizer arm, left. Third Embodiment.
290 Rear end assembly, ball pivot. Fourth Embodiment. The assembly adds a degree of motion.

300 Main pivot body assembly, ball pivot. Fourth Embodiment.
310 Top pivot body, ball pivot.
320 Bottom pivot body, ball pivot.
330 Ball pivot shaft.
340 Center of spherical rotation for ball pivot shaft.
350 Ball on pivot shaft.
360 Ball cup in body assembly contains ball and allows for full spherical freedom of movement.
370 Rear end assembly, universal joint. Fifth Embodiment.
380 Pivot post, universal joint.
390 Main pivot body, universal joint.
400 Stabilizer arm, left. Fifth Embodiment.
402 Upper end, Stabilizer Arm.
408 Lower end, Stabilizer Arm.
410 Stabilizer arm, right. Fifth Embodiment.
412 Upper end, Stabilizer Arm.
418 Lower end, Stabilizer Arm.
430 Axis of 'X' rotation for Fifth Embodiment.
440 Axis of rotation for Fifth Embodiment, CLB.
450 Universal pivot shaft bushing.
460 Pivot post bushing universal.
500 Sixth Embodiment.
510 Right Stabilizer Arm.
512 Upper Cylinder End, right.
518 Stabilizer Arm right, lower end.
520 Left Stabilizer Arm.
522 Upper Cylinder end, left
528 Stabilizer Arm left, lower end.
530 Horizontal pivot bar.

First Embodiment

FIG. 1 is a front perspective view of a first embodiment of the solid axle differential suspension assembly 10.

FIG. 2 is a rear perspective view of the solid differential housing suspension assembly 10 of FIG. 1. FIG. 3 is a top view showing the solid differential housing suspension assembly 10 of FIG. 1. FIG. 4 is a front view showing the solid differential housing suspension assembly 10 of FIG. 1.

Referring to FIGS. 1-4, the suspension assembly 10 can include existing solid axle housings 30 of a motor vehicle such as an automobile, with axles contained within the axle housings that have ends to which the vehicle wheels can be attached. Most of the existing motor vehicle solid axle housing(s) 30 can have a pair of swing arms 50 attached thereto, with the opposite ends of the solid axle housing affixed to a central differential 20. Therefore, the swing arms 50 are attached between the central differential housing 20 and the ends of the axle housings 30. The outer ends of the swing arms 50 can be attached to a vehicle chassis by the bushing brackets 40.

FIG. 5 is a cross-sectional view of the rear suspension assembly 10 of FIG. 4 along arrows 5X.

FIG. 6 is another front view of the rear suspension assembly 10 of FIG. 4 that shows the axle housing 30 at the low point of its 'Y' travel as indicated by the motion arrows.

FIG. 7 is another front view of the rear suspension assembly 10 of FIG. 6 showing the axle at the high point of travel along axis 'Y'.

FIG. 8 is another front view of the rear suspension assembly 10 of FIG. 6 showing axle twisted to the extreme of its clockwise rotation about the 'X' axis.

Figure 9:
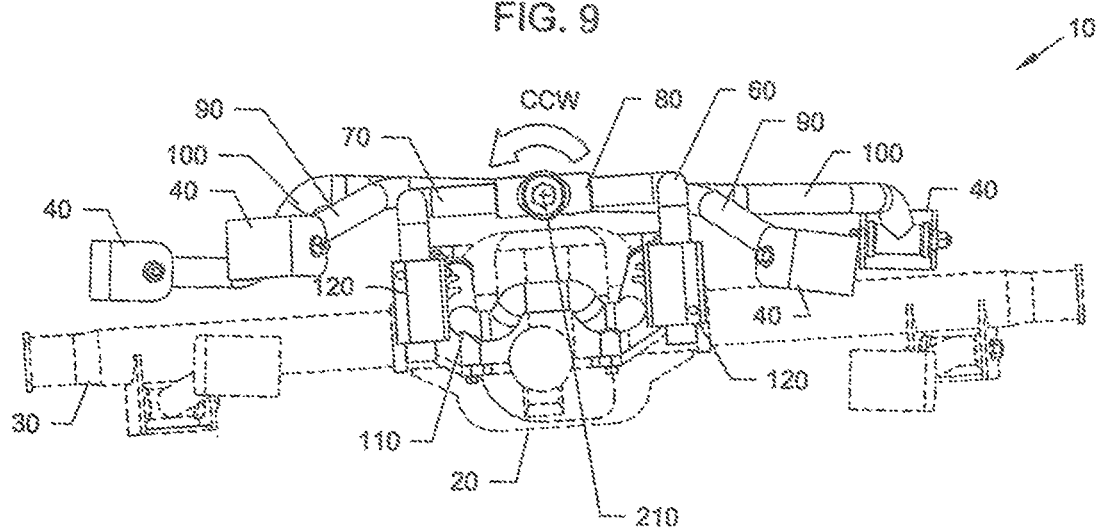
FIG. 9 is another front view of the rear suspension assembly of FIG. 8 showing extreme counter-clockwise rotation about the 'X' axis.

FIG. 9 is another front view of the rear suspension assembly 10 of FIG. 8 showing extreme counter-clockwise rotation about the 'X' axis.

Figure 10:
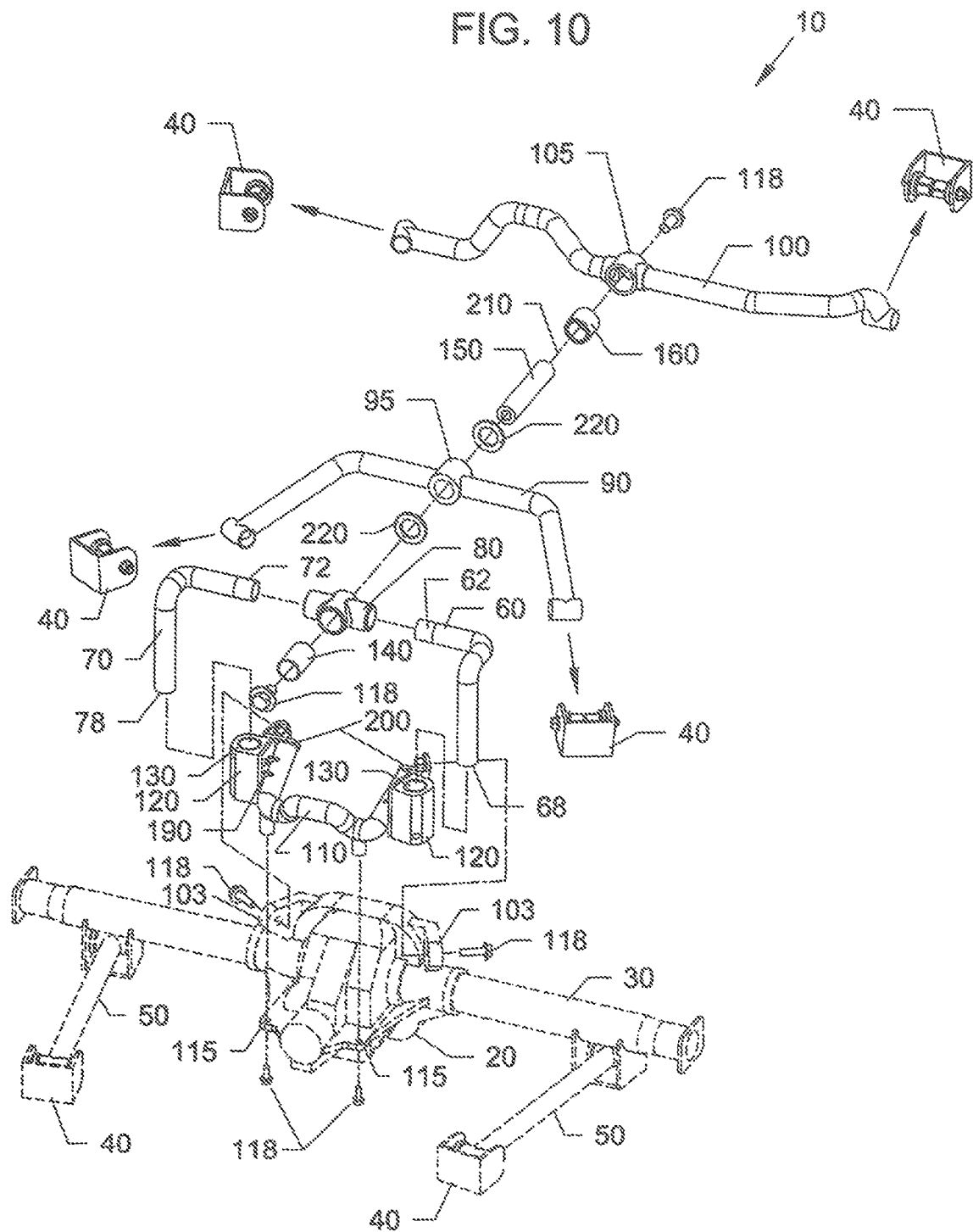
FIG. 10 is an exploded perspective view of the rear suspension assembly of the preceding FIGURES.

FIG. 10 is an exploded perspective view of the rear suspension assembly 10 of the preceding FIGURES.

Referring to FIGS. 1-10, the rear suspension assembly 10 can include the addition of an upper front pivot shaft mount support 90 having outer ends with bushing brackets 40 that can also be attached to different locations on the vehicle chassis, and an upper rear pivot shaft mount support 100 having outer ends with bushing brackets 40 that can also be attached to different locations on the vehicle chassis.

Upper front pivot shaft mount support 90 can have a generally straight middle section with a cylindrical pivot shaft mount 95, and with ends that flair outward. Upper rear pivot shaft mount support 100 can have a middle section with a cylinder pivot shaft mount 105.

Upper front pivot shaft mount 95 and upper rear pivot shaft mount 105 can be attached to one another by a pivot shaft 150 having one end that passes through front and rear pivot shaft mounts 95 and 105 and can be held in place by a bolt & washer combination 118. The pivot shaft mount 95 can also have a pivot shaft busing 160. The opposite end of pivot shaft 150 can pass through a pivot washer 220 and into and through cylindrical pivot shaft mount 80 of upper front pivot shaft mount support and into one end of pivot body bushing 140. The pivot body bushing 140 can be located inside of main body pivot 80, so that another bolt & washer combination 118 is fastened about one end of the main body pivot 80. A pair of pivot washers 220 can sandwich about the front pivot shaft mount 80.

A left stabilizer arm 60 having a generally inverted L shape can have an upper end 62 that fits into a right socket of main pivot body 80, and a lower end 68 that fits into an upper end of a right bushing block 120 that is fixably attached (by welding and the like) to a right leg of a U shaped differential mount tube 110 by a bushing block gusset 190.

A right stabilizer arm 70 having a generally inverted L shape can have an upper end 72 that fits into a left socket of the main pivot body 80, and a lower end 78 that fits into an upper end of a left bushing block 120 that is rigidly attached (by welding and the like) to a left leg of the U shaped differential mount tube 110 by a bushing block gusset 190. Each of the bushing blocks 120 can have a bearing/bushing 130 housed inside.

A middle portion of differential mount tube 110 can be mounted to differential 20 by other bolts 118 that pass through edges of lower differential mount flanges 115 which extends from a lower portion of the differential 20. Outer ends of differential mount tube 110 can be mounted to upper differential mount flanges 103 which extend from an upper portion of the differential 20 by other bolts 118. Brackets 200 on ends of the differential mount tube 110 can mount to the upper differential mount flanges 103.

Up and Down Movements of Axle

Referring to FIGS. 6 and 10, the axle housing 30 can move to its' lowest point of its' Y' travel by inside bearing/bushing 130 of left and right bushing blocks 120 sliding down about both lower legs of left stabilizer arm 60 and right stabilizer arm 70.

Referring to FIGS. 6, 7 and 10, the axle 30 can move to its high point of 'Y' travel with the inside bearing/bushing 130 of left and right bushing blocks 120 sliding upward about both lower legs of left stabilizer arm 60 and right stabilizer arm 70 exposing the lower ends 68, 78 of the stabilizer arms 60, 70.

Clockwise (CW) and Counter-Clockwise (CCW) Movements of Axle

Referring to FIGS. 3, 6, 8 and 10, axle housing 30 can tilt clockwise (CW) when a right wheel on the axle housing 30 passes over a bump, etc., so that axle housing 30 can rotate clockwise (CW) about the 'X' pivot axis line 210 that runs through components 80, 95, 105 and 220. FIG. 8 shows axle housing 30 twisted to the extreme of its clockwise (CW) rotation.

Referring to FIGS. 3, 6, 8, 9 and 10, axle housing 30 can tilt counter-clockwise (CCW) to the left when a left wheel on the axle housing 30 passes over a bump, etc., so that axle housing 30 can rotate counter-clockwise (CCW) relative to the 'X' pivot axis line 210 that runs through components 80, 95, 105 and 220. FIG. 9 is another front view of the rear suspension assembly 10 of FIG. 8 and shows the axle housing 30 twisted to the extreme of its' counter-clockwise (CCW) rotation.

Second Embodiment

FIG. 11 is a front perspective view of a second embodiment of the rear suspension assembly 230 which differs from the first embodiment only in placement of the stabilizer arms 90, 240, 250 and main pivot body 80 and pivot shaft mount 95. FIG. 12 is a rear perspective view of the rear suspension assembly 230 of FIG. 11.

Referring to FIGS. 11-12, the rear suspension assembly 230 can have upper ends of a left stabilizer arm 240 and right stabilizer arm 250, that fit into left and right sockets of a main pivot body 80, and lower ends of the arms 240, 250 fitting into bushing blocks 120 having inner bearings/bushings 130. As compared to the previous embodiment, main pivot body 80 with left and right stabilizer arms 240, 250 can be sandwiched between pivot shaft mount B, 95 and pivot shaft mount C, 105. Otherwise the other components can function similar to the previous embodiment.

Third Embodiment

FIG. 13 is a front perspective view of a third embodiment of the rear suspension assembly 260 which differs from the first embodiment 10 and second embodiment 230 only in placement of the stabilizer arms 270, 280 and main pivot body 80 and pivot shaft mounts B, 95 and C, 105. FIG. 14 is a rear perspective view of the third embodiment of the rear suspension assembly 260 of FIG. 13.

Referring to FIGS. 13-14, the rear suspension assembly 260, can place the main pivot body 80 behind the pivot shaft mount C 105. The upper ends of the right stabilizer arm 270 and left stabilizer arm 280 can attach into left and right sockets of the main pivot body 80. The lower ends of the right and left stabilizer arms 270, 280 can fit into the bearings/bushings 130 inside of the bushing blocks 120. Otherwise the other components can function similar to the previous embodiments.

Fourth Embodiment

FIG. 15 is a front perspective view of the fourth embodiment rear suspension assembly 290 of FIGS. 13-14 with a full 360 degree pivot motion by way of a ball joint. FIG. 16 is a rear perspective view of the fourth embodiment rear suspension assembly 290 of FIG. 15. FIG. 17 is a top view of the fourth embodiment rear suspension assembly 290 of FIG. 15. FIG. 18 is a front view of the fourth embodiment rear suspension assembly 290 of FIG. 15.

FIG. 19 is a cross-sectional view of the rear suspension assembly 290 of FIG. 18 along arrows 19X.

FIG. 20 is a top view of the fourth embodiment rear suspension assembly 290 of FIG. 15 showing counter-clockwise motion facilitated by use of the pivot ball joint.

FIG. 21 is a top view of the fourth embodiment rear suspension assembly 290 of FIG. 20 showing clockwise (CW) motion.

FIG. 22 is an exploded perspective view of the fourth embodiment rear suspension assembly 290 of FIGS. 15-21.

Referring to FIGS. 15-22, the fourth embodiment rear suspension assembly 290 includes most of the same components of the previous embodiments. Here, a main pivot body assembly 300 includes a top pivot body bracket 310 and a bottom pivot body bracket 320 which can be attached to one another by fasteners, such as bolts/screws and nuts. When attached together, the main pivot body assembly 300 allows for upper ends 68, 78 of the stabilizer arms 60, 70 to be attached thereto. In a middle section of the main pivot body assembly 300, there is formed a ball cup 360 to contain a ball end 350 that is on the outer end of a ball pivot shaft 330. The ball 350 having a center of spherical rotation 340 on the ball pivot shaft 330. The ball cup 360 contains the ball 350 and allows for a full spherical freedom of movement. The centerline axis of the ball pivot shaft 330 is the same as that of pivot shaft 150 and is parallel to the 'X' axis.

Fifth Embodiment

FIG. 23 is a front perspective view of the fifth embodiment rear suspension assembly 370 which uses 2 linear shafts to facilitate the 360 degree motion established in the fourth embodiment 290. FIG. 24 is a rear perspective view of the fifth embodiment rear suspension assembly 370 of FIG. 23. FIG. 25 is a top view of the fifth embodiment rear suspension assembly 370 of FIG. 23. FIG. 26 is a front view of the fifth embodiment rear suspension assembly 370 of FIG. 23.

FIG. 27 is a cross-sectional view of the rear suspension assembly 370 of FIG. 26 along arrows 27X.

FIG. 28 is top front perspective view of the fifth embodiment rear suspension assembly 370 of FIGS. 23-27, showing the rotation of the intermediate bracket.

FIG. 29 is an exploded perspective view of the fifth embodiment rear suspension assembly 370 of FIGS. 23-28.

Referring to FIGS. 23-29, the fifth embodiment rear suspension assembly 370 includes most of the same components of the previous embodiments. Similar to the previous embodiments, left stabilizer arm 400 can have an inverted L shape with an upper end 402 and a lower end, and right stabilizer arm 410 can also have an inverted L shape with an upper end 412 and a lower end 418. Upper end 412 of left stabilizer arm 410 can fit into a left socket of a main pivot body 390, and upper end 402 of right stabilizer arm 400 can fit into the right socket of the main pivot body 390. The lower ends 418, 408 of the respective stabilizer arms 400, 410 can fit into and slide relative to the bushing blocks 120, similar to those components in the previous embodiments.

The downwardly protruding portion of pivot post 380 can pass into a pivot post bushing 460 and together into an upper socket of the main pivot body 390, and held in place by a bolt & washer combination 118 under the main pivot body 390. A universal pivot shaft 150 can have one end that fits into the upper cylinder portion of pivot post 380. And a universal pivot shaft bushing 450 between the pivot shaft 150 and the inside of both the upper cylinder portion of pivot post 380 and the inside of pivot shaft mount B, 95 of upper front pivot shaft support 90. The other components 105, 220 and bolt and washer and nut combination 118 function similarly as in the previous embodiments.

Referring to FIGS. 25, 28 and 29, pivot post 380 is a universal joint, along with main pivot body 390 which also functions as a universal joint, allowing for both an axis 430 of 'X' rotation, and an axis 440 of 'Y' rotation.

Sixth Embodiment

FIG. 30 is a perspective view of a sixth embodiment of the rear suspension assembly 500 with an additional swivel/rotation point can be added to the intermediate bracket of the first embodiment.

Referring to FIG. 30, a horizontal pivot bar 530 can be mounted to the main pivot body 390.

A left stabilizer arm 510 with an inverted L shape can have an upper cylinder end 512 which is able to swivel about one end portion of center bar 530, and a lower end 518 which can slidably move through left bushing block 120, in a similar manner to the lower ends of left stabilizer arms in the previous embodiments.

A right stabilizer arm 520 with an inverted L shape can have an upper cylinder end 522 which is able to swivel about another end portion of the center bar 530, and a lower end 522 which can slidably move through the right bushing block 120 in a manner similar to those like components in the previous embodiments.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A vehicle rear suspension system, comprising:
an upper elongated front support having ends attached to a vehicle chassis and a middle portion therebetween;
an upper elongated rear support having ends attached to the vehicle chassis and a middle portion therebetween;
a connector for attaching the middle portion of the upper elongated front support to the middle portion of the upper elongated rear support, the connector for allowing the upper elongated front support and the upper elongated rear support to pivot to one another about the connector;
a left stabilizer arm having an upper end attached to a left side of the connector, and a lower end;
a right stabilizer arm having an upper end attached to a right side of the connector, and a lower end;
a left bushing block mounted to a left side of a differential which is mounted on a vehicle axle, wherein the lower end of the left stabilizer arm is slidable up and down within the left bushing block; and
a right bushing block mounted to a right side of the differential, wherein the lower end of the right stabilizer arm is slidable up and down within the right bushing block, and wherein the connector allows the axle to rotate clockwise and counter-clockwise relative to the vehicle chassis.

2. The vehicle rear suspension system of claim 1, further comprising:
a differential mount tube having a left side mounted to the left bushing block and a right side mounted to the right bushing block, and having brackets for mounting the differential mount tube to sides of the differential.

3. The vehicle rear suspension system of claim 2, wherein the differential mount tube is attached to the connector in front of the upper elongated front support.

4. The vehicle rear suspension system of claim 2, wherein the differential mount tube is attached to the connector between the upper elongated front support and the upper elongated rear support.

5. The vehicle rear suspension system of claim 2, wherein the differential mount tube is attached to the connector behind both the upper elongated front support and the upper elongated rear support.

6. The vehicle rear suspension system of claim 1, further comprising:
bushing brackets for attaching the ends of the upper elongated front support and the ends of the upper elongated rear support to the vehicle chassis.

7. The vehicle rear suspension system of claim 2, wherein the connector includes:
a pivot shaft; and
pivot bushings about the pivot shaft for allowing the upper front support and the upper rear support and the differential mount tube to pivot relative to one another.

8. The vehicle rear suspension system of claim 2, wherein the connector includes:
a bracket having a ball cup, the bracket for attaching the upper end of the left stabilizer arm and the upper end of the right stabilizer arm to be fixed to one another;
a ball pivot on a front end of the connector for being slidingly mounted inside of the bracket, the ball pivot for allowing 360 degree pivot motion of the left and the right stabilizer arms.

9. The vehicle rear suspension system of claim 8, wherein the ball pivot allows for clockwise and counter-clockwise rotation of the axle relative to the vehicle chassis.

10. A vehicle rear suspension assembly, comprising:
front and rear supports having ends attached to a vehicle chassis, and middle portions;
a connector for attaching the middle portions of the front and rear supports to one another and for attaching the middle portions of the front and rear supports to a differential on a rear vehicle axis, wherein the suspension assembly allows the vehicle axle to float up and down and rotate relative to the vehicle chassis.

* * * * *